(12) United States Patent
Liang et al.

(10) Patent No.: US 11,507,844 B2
(45) Date of Patent: Nov. 22, 2022

(54) ASYNCHRONOUS EVALUATION STRATEGY FOR EVOLUTION OF DEEP NEURAL NETWORKS

(71) Applicant: Cognizant Technology Solutions U.S. Corporation, College Station, TX (US)

(72) Inventors: Jason Zhi Liang, Fremont, CA (US); Hormoz Shahrzad, Dublin, CA (US); Babak Hodjat, Dublin, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 1296 days.

(21) Appl. No.: 15/915,028

(22) Filed: Mar. 7, 2018

(65) Prior Publication Data

US 2018/0260713 A1    Sep. 13, 2018

Related U.S. Application Data

(60) Provisional application No. 62/468,224, filed on Mar. 7, 2017.

(51) Int. Cl.
*G06N 3/08* (2006.01)
*G06N 3/04* (2006.01)

(52) U.S. Cl.
CPC .............. *G06N 3/086* (2013.01); *G06N 3/04* (2013.01); *G06N 3/0454* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 5,140,530 A | 8/1992 | Guha et al. | 395/13 |
| 5,761,381 A | 6/1998 | Arci et al. | |

(Continued)

FOREIGN PATENT DOCUMENTS

| | | |
|---|---|---|
| EP | 0762294 A2 | 3/1997 |
| EP | 2422276 | 2/2012 |

(Continued)

OTHER PUBLICATIONS

Garcia-Pedrajas et al., "COVNET: A Cooperative Coevolutionary Model for Evolving Artificial Neural Networks", IEEE Transactions on Neural Networks, vol. 14, No. 3, (2003). (Year: 2003).*

(Continued)

*Primary Examiner* — Alexey Shmatov
*Assistant Examiner* — Beatriz Ramirez Bravo
(74) *Attorney, Agent, or Firm* — Dawn-Marie Bey; Bey & Cotropia PLLC

(57) ABSTRACT

The technology disclosed proposes a novel asynchronous evaluation strategy (AES) that increases throughput of evolutionary algorithms by continuously maintaining a queue of K individuals ready to be sent to the worker nodes for evaluation and evolving the next generation once a fraction Mi of the K individuals have been evaluated by the worker nodes, where Mi<<K. A suitable value for Mi is determined experimentally, balancing diversity and efficiency. The technology disclosed is extended to coevolution of deep neural network supermodules and blueprints in the form of AES for cooperative evolution of deep neural networks (CoDeepNEAT-AES). Applied to image captioning domain, a three-fold speedup is observed on 200 graphics processing unit (GPU) worker nodes, demonstrating that the disclosed AES and CoDeepNEAT-AES are promising techniques for evolving complex systems with long and variable evaluation times.

31 Claims, 13 Drawing Sheets

(56) References Cited

U.S. PATENT DOCUMENTS

| | | | |
|---|---|---|---|
| 5,845,266 | A | 12/1998 | Lupien et al. |
| 5,920,848 | A | 7/1999 | Schutzer et al. |
| 5,930,780 | A | 7/1999 | Hughes et al. |
| 6,240,399 | B1 | 5/2001 | Frank et al. |
| 6,249,783 | B1 | 6/2001 | Crone et al. |
| 7,013,344 | B2 | 3/2006 | Megiddo |
| 7,246,075 | B1 | 7/2007 | Testa |
| 7,370,013 | B1 | 5/2008 | Aziz et al. |
| 7,444,309 | B2 | 10/2008 | Branke et al. |
| 8,639,545 | B2 | 1/2014 | Cases et al. |
| 8,768,811 | B2 | 7/2014 | Hodjat et al. |
| 9,053,431 | B1 | 6/2015 | Commons |
| 9,466,023 | B1 | 10/2016 | Shahrzad et al. |
| 9,785,886 | B1 | 10/2017 | Andoni et al. |
| 2002/0019844 | A1 | 2/2002 | Kurowski et al. |
| 2003/0014379 | A1 | 1/2003 | Saias et al. |
| 2003/0158887 | A1 | 8/2003 | Megiddo |
| 2004/0143559 | A1 | 7/2004 | Ayala ............... 706/13 |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0136480 | A1 | 6/2005 | Brahmachuri et al. ........ 435/7.1 |
| 2005/0187848 | A1 | 8/2005 | Bonissone et al. |
| 2005/0197875 | A1 | 9/2005 | Kauffman |
| 2005/0198103 | A1 | 9/2005 | Ching |
| 2006/0218107 | A1 | 9/2006 | Young ............... 706/13 |
| 2007/0100907 | A1 | 5/2007 | Bayer |
| 2007/0143198 | A1 | 6/2007 | Brandes et al. |
| 2007/0143759 | A1 | 6/2007 | Ozgur et al. |
| 2007/0150435 | A1 | 6/2007 | Murakawa et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 | 5/2009 | Blondeau et al. |
| 2009/0327178 | A1 | 12/2009 | Jacobson |
| 2010/0030720 | A1 | 2/2010 | Stephens |
| 2010/0111991 | A1 | 5/2010 | Raitano et al. ............ 424/185.1 |
| 2010/0182935 | A1 | 7/2010 | David |
| 2010/0256795 | A1 | 10/2010 | McLaughlin et al. |
| 2010/0257228 | A1 | 10/2010 | Staggs et al. |
| 2010/0257605 | A1 | 10/2010 | McLaughlin et al. |
| 2010/0274742 | A1 | 10/2010 | Hodjat et al. |
| 2012/0239592 | A1 | 9/2012 | Esbensen |
| 2012/0313798 | A1 | 12/2012 | Markram |
| 2013/0006901 | A1* | 1/2013 | Cantin ............... G06N 20/00 706/13 |
| 2013/0124440 | A1* | 5/2013 | Hodjat ............... G06N 3/126 706/13 |
| 2013/0311412 | A1 | 11/2013 | Lazar et al. |
| 2014/0011982 | A1 | 1/2014 | Marasco et al. ... C07K 16/1018 |
| 2015/0288573 | A1 | 10/2015 | Baughman et al. |
| 2016/0048753 | A1 | 2/2016 | Sussillo et al. |
| 2016/0063359 | A1 | 3/2016 | Szegedy et al. |
| 2016/0329047 | A1 | 11/2016 | Tur |
| 2016/0364522 | A1 | 12/2016 | Frey et al. ............... G06F 19/22 |
| 2017/0109355 | A1 | 4/2017 | Li et al. ............... G06F 17/3053 |
| 2017/0116520 | A1* | 4/2017 | Min ............... G06N 3/08 |
| 2017/0193367 | A1 | 7/2017 | Miikkulainen et al. ............... G06N 3/086 |
| 2017/0213156 | A1 | 7/2017 | Hammond et al. .. G06N 99/005 |
| 2017/0323636 | A1 | 11/2017 | Xiao et al. |
| 2018/0053092 | A1 | 2/2018 | Hajizadeh |
| 2018/0114115 | A1 | 4/2018 | Liang et al. |
| 2018/0114116 | A1 | 4/2018 | Liang et al. |
| 2018/0240041 | A1 | 8/2018 | Koch et al. |

FOREIGN PATENT DOCUMENTS

| | | |
|---|---|---|
| EP | 2422278 | 2/2012 |
| JP | 08-110804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 6/2007 |
| JP | 2007207173 | 8/2007 |
| JP | 2007522547 | 8/2007 |
| JP | 2008129984 | 6/2008 |
| WO | WO 2005/073854 | 8/2005 |
| WO | WO 2010/120440 | 10/2010 |
| WO | WO 2017/161233 | 9/2017 |
| WO | WO 2018/211138 | 11/2018 |
| WO | WO 2018/213840 | 11/2018 |

OTHER PUBLICATIONS

Moriarty et al., "Hierarchical Evolution of Neural Networks", IEEE (1998). (Year: 1998).*

U.S. Appl. No. 15/794,913—Non-Provisional Application filed Oct. 26, 2017, 73 pages.

E. Meyerson and R. Miikkulainen, "Pseudo-Task Augmentation: From Deep Multitask Learning to Intratask Sharing and Back," ICML, 2018.

J. Z. Liang, et al., "Evolutionary Architecture Search For Deep Multitask Networks," GECCO, 2018.

E. Meyerson and R. Miikkulainen, "Beyond Shared Hierarchies: Deep Multitask Learning Through Soft Layer Ordering," ICLR, 2018.

International Search Report and Written Opinion for PCT Application No. PCT/US 18/65472, dated Mar. 27, 2019, 8 pp.

Risto Miikkulainen, "Evolving Multitask Neural Network Structure," The University of Texas at Austin and Sentient Technologies, Inc., Aug. 26, 2013.

Bredeche, et al., "On-Line, On-Board Evolution of Robot Controllers," In: Artificial Evolution: $9^{th}$ International Conference, Evolution Artificielle, EA, 2009, Strasbourg, France, Oct. 26-28, 2009 [online], [retrieved on Mar. 15, 2019], Retrieved from the Internet: https://dl.acm.org/citation.cfm?id=1883723.1883738.

Rosenbaum, et al., "Routing Networks: Adaptive Selection of Non-Linear Funcdtions For Multi-Task Learning," In: Cornell University Library/Computer Science/Machine Learning, Dec. 31, 2017 [online] [retrieved on Mar. 15, 2019], Retrieved from the Internet: https://arxiv.org/abs/1711.01239v2.

Bonadiman, et al., "Multitask Learning with Deep Neural Networks For Community Question Answering," In: Cornell University Library/Computer Science/Machine Learning, Feb. 13, 2017 [online] [retrieved on Mar. 15, 2019], Retrieved from the Internet: https://arxiv.org/abs/1702.03706.

Ruder, "An Overview of Multi-Task Learning in Deep Neural Networks," In: Cornell University Library/Computer Science/Machine Learning, Jun. 15, 2017 [online] [retrieved on Mar. 15, 2019], Retrieved from the Internet: https://arxiv.org/abs/1706.05098.

Hodjat et al., "Chapter 5: Introducing an Age-Varying Fitness Estimation Function." Genetic Programming Theory and Practice X. Ed. Riolo et al., Springer Apr. 19, 2013, pp. 59-71.

Gonzalez, et al., "Evolving Loss Functions With Multivariate Taylor Polynomial Parameterizations," Version 1, published arXiv: 2002.00059v1, Jan. 31, 2020.

Gonzalez, et al., "Evolving Loss Functions With Multivariate Taylor Polynomial Parameterization," Version 2, published arXiv: 2002.00059v2, Feb. 10, 2020.

Gonzalez, et al., "Optimizing Loss Functions Through Multivariate Taylor Polynomial Parameterization," Version 3 (published arXiv:2002.00059v3), Jun. 6, 2020.

N. Hansen, et al., "Adapting arbitrary normal mutation distributions in evolution strategies: The covariance matrix adaptation," In Proceedings of IEEE International Conference on Evolutionary Computation, pp. 312-317, IEEE, 1996.

Hansen, et al., "Completely derandomized self-adaptation in evolution strategies," Evolutionary Computation, vol. 9, No. 2, pp. 159-195, 2001.

N. Hansen, et al., "Evaluating the CMA evolution strategy on multimodal test functions," International Conference on Parallel Problem Solving from Nature, Springer, pp. 282-291, 2004.

(56) References Cited

OTHER PUBLICATIONS

H. Li, et al., "Visualizing the loss landscape of neural nets," Advances in Neural Information Processing Systems 31, pp. 6389-6399 (Curran Associates, Inc., 2018).
Liang, et al., "Population-Based Training for Loss Function Optimization," arXiv:2002.04225v1 (Feb. 11, 2020).
"Python vs. R for Artificial Intelligence, Machine Learning, and Data Science," by Scenario or Task by Alex Castrounis of Innoarchitech, published online by O'Reilly Media, Copyright InnoArchiTech LLC 2020.
Production vs Development Artificial Intelligence and Machine Learning, by Alex Castrounis of Innoarchitech, published online by O'Reilly Media, Copyright InnoArchiTech LLC 2020.
"Advanced Analytics Packages, Frameworks, and Platforms by Scenario or Task," by Alex Castrounis of Innoarchitech, published online by O'Reilly Media, Copyright InnoArchiTech LLC 2020.
Santiago Gonzalez, "Loss Function Optimization Using Evolutionary Computation and Multivariate Function Approximators, Particularly Multivariate Taylor Expansions," 5 pp., Aug. 22, 2019.
Santiago Gonzalez, et al., "Improved Training Speed, Accuracy, and Data Utilization Through Loss Function Optimization," Version 1, arXiv: 1905.11528v1, dated May 27, 2019.
Santiago Gonzalez, et al., "Improved Training Speed, Accuracy, and Data Utilization Through Loss Function Optimization," Version 2, arXiv: 1905.11528v2, dated Feb. 10, 2020.
Santiago Gonzalez, et al., "Improved Training Speed, Accuracy, and Data Utilization Through Loss Function Optimization," Version 3, arXiv: 1905.11528v3, dated Apr. 27, 2020.
J. T. Barron, "A General and Adaptive Robust Loss Function," arXiv: 1701.03077, 2018.
K. Janocha and W. M. Czarnecki, "On Loss Functions For Deep Neural Networks in Classification," arXiv: 1702.05659, 2017.
A. Krizhevsky, et al., "ImageNet Classification With Deep Convolutional Neural Networks," NIPS'12: Proceedings of the 25th International Conference on Neural Information Processing Systems, vol. 1, Dec. 2012, pp. 1097-1105.
"CS 224D: Deep Learning for NLP, Lecture Notes: Part 111", 14 pp., Spring, 2016.
"CS 224D: Deep Learning for NLP, Lecture Notes: Part IV", 12 pp., Spring, 2015.
"CS 224D: Deep Learning for NLP, Lecture Notes: Part V", 6 pp., Spring, 2015.
U.S. Appl. No. 62/468,224, titled "Asynchronous Evaluation Strategy For Evolution of Deep Neural Networks," filed Mar. 7, 2017.
Aditya Rawal and Risto Miikkulainen, "From Nodes to Networks: Evolving Recurrent Neural Networks." GECCO '18, Jul. 15-19, 2018, Kyoto, Japan.
Julian G. Zilly, Rupesh Kumar Srivastava, Jan Koutnik, and Jurgen Schmidhuber, "Recurrent Highway Networks." CoRR abs/1607.03474. 2016 (Arxiv: 1607.03474).
J. Z. Liang, E. Meyerson, and R. Miikkulainen, "Evolutionary Architecture Search For Deep Multitask Networks," GECCO, 2018.
U.S. Appl. No. 62/627,658, titled "From Nodes to Networks: Evolving Recurrent Neural Networks," filed Feb. 7, 2018.
U.S. Appl. No. 62/627,161, titled "From Nodes to Networks: Evolving Recurrent Neural Networks." filed Feb. 6, 2018.
U.S. Appl. No. 62/598,409, titled "Evolving Multitask Neural Network Structure," filed Dec. 13, 2017.
U.S. Appl. No. 15/794,905, titled Evolution of Deep Neural Network Structures, filed Oct. 26, 2017.
Miikkulainen, Risto, et al., "Evolving deep neural networks.", Mar. 4, 2017, 8 pages.
Stanley, Kenneth O., et al., "Real-time evolution of neural networks in the NERO video game." AAAI. vol. 6. 2006, 4 pages.
Scott, E.O., et al., "Understanding simple asynchronous evolutionary algorithms", Jan. 17-20, 2015, 15 pages.
Garcia-Pedraja, et al., "Cooperative-Coevolution-of-Artificial-Neural-Networks", 2005, 32 pages.
Stanley, et al., "Evolving Neural Networks through Augmenting Topologies", 2002, 30 pages.
Snoek, et al., "Scalable Bayesian Optimization Using Deep Neural Networks", 2015, 13 pages.
U.S. Appl. No. 15/794,905—Non Provisional Application filed Oct. 26, 2017, 60 pages.
Kenneth O. Stanley and Risto Miikkulainen, "Evolving Neural Networks Through Augmenting Topologies," Evolutionary Computation, 10(2):99-127, 2002.
International Search Report and Written Opinion for PCT Application No. PCT/US 18/64428, dated Mar. 26, 2019, 12 pp.
International Search Report and Written Opinion for PCT App. No. PCT/US19/61198, dated Mar. 11, 2020, 15 pp.
Moriarty, David E., et al., "Forming neural networks through efficient and adaptive coevolution," Evolutionary Computation 5.4, 1997.
Lee, Chi-Ho, et al., "Evolutionary ordered neural network with a linked-list encoding scheme," Proceedings of IEEE International Conference on Evolutionary Computation, IEEE, 1996.
Utech, J., et al., "An evolutionary algorithm for drawing directed graphs," Proc. of the Int. Conf. on Imaging Science, Systems and Technology, 1998.
International Preliminary Report on Patentability for PCT App. No. PCT/US2019/061198, dated Nov. 18, 2020, 24 pp.
Li, Xiaodong, and Michael Kirley, "The effects of varying population density in a fine-grained parallel genetic algorithm." Evolutionary Computation, 2002. CEC'02. Proceedings of the 2002 Congress on. vol. 2. IEEE, 2002.
Fidelis, Marcos Vinicius, Heitor S. Lopes, and Alex A. Freitas. "Discovering comprehensible classification rules with a genetic algorithm." Evolutionary Computation, 2000. Proceedings of the 2000 Congress on. vol. 1. IEEE, 2000.
Dec. 23, 2008 International Search Report and Written Opinion for PCT/US2008/82876, 10 pp.
Koza, J.R., "Genetic Programming: On the Programming of Computers by Means of Natural Selection", Dec. 1992, MIT Press, pp. 1-609.
Nov. 26, 2012 Extended EP SR for EP 08847214, 9 pp.
Enee, Gilles et al., "Classifier Systems Evolving Multi-Agent System with Distributed Elitism." Proc. 1999 Congress on Evolutionary Computation (CEC'99) vol. 3:6, Jul. 1999, pp. 1740-1746.
Tanev I et al., "Scalable architecture for parallel distributed implementation of genetic programming on network of workstations," J. Systems Architecture, vol. 47, Jul. 2001, pp. 557-572.
Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mita rb/streiche/publications/Introduction to E volutionary Algorithms.pdf).
Poli R et al., "Genetic Programmig: An introductory Tutorial and a Survey of Techniques and Applications." Univ. Essex School of Computer Science and Eletronic Engineering Technical Report No. CES-475, Oct. 2007, 112 pp.
Jun. 16, 2011 Written Opinion from Singapore Patent Office in related application SG 201003127-6, 9 pp.
Apr. 20, 2012 Exam Report for related application AU 2008323758, 2 pp.
Sakauchi et al., UNIFINE: A Next Generation Financial Solution System of Nihon Unisys Ltd., Technology Review 'UNISYS,' Japan, Nihon Unisys Ltd., Feb. 28, 2006, vol. 25, No. 4, pp. 14-15.
JP 2010-533295, Office Action dated Apr. 16, 2013, 12 pages.
U.S. Appl. No. 14/014,063—Office Action dated May 7, 2014, 19 pages.
JP 2012-508663—Office Action dated Apr. 1, 2014, 6 pages (with English Translation).
JP 2012-508660—Office Action dated Apr. 1, 2014, 8 pages (with English Translation).
International Search Report dated Jun. 29, 2010 in PCT/US10/32841.
M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, 2003, pp. 61-66.
JE Bartlett II, et al., "Organizational Research: Determining Appropriate Sample Size in Survey Research," IT, Learning, and Performance Journal 19(1) 2001, 8pp.

(56) References Cited

OTHER PUBLICATIONS

JC Bongard, et al., "Guarding Against Premature Convergence while Accelerating Evolutionary Search," Proc. 12th annual conf. of Genetic and evolutionary computation, 20201, 8pp.
M Davarynejad, "Fuzzy Fitness Granulation in Evolutionary Algorithms for complex optimization," Master of Science Thesis, Ferdowsi Univ. of Mashhad, 2007, 30pp.
M Davarynejad et al., "A Novel General Framework for Evolutionary Optimization: Adaptive Fuzzy Fitness Granulation," CEC 2007, 6pp.
E Ducheyne et al., "Is Fitness Inheritance Useful for Real-World Applications?" Evolutionary Multi-Criterion Optimization, ser. LNCS 2631, 2003, pp. 31-42.
JM Fitzpatrick et al., "Genetic Algorithms in Noisy Environments," Machine Learning 3: 101-120, 1988.
A Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.
PS Georgilakis, "Genetic Algorithm Model for Profit Maximization of Generating Companies in Deregulated Electricity Markets," Applied Artificial Intelligence, 2009, 23:6,538-552.
G Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.
H Juille, "Evolution of Non-Deterministic Incremental Algorithms as a New Approach for Search in State Spaces," Proc. 6th Int'l Conf. on Genetic Algorithms, 1995, 8pp.
A Kosorukoff, "Using incremental evaluation and adaptive choice of operators in a genetic algorithm," Proc. Genetic and Evolutionary Computation Conference, GECCO—2002, 7pp.
A Nelson, "Fitness functions in evolutionary robotics: A survey and analysis," Robotics and Autonomous Systems 57 (2009) 345-370.
S Remde, et al. "Evolution of Fitness Functions to Improve Heuristic Performance," LION 2007 II, LNCS 5313 pp. 206-219.
J Sacks, et al. "Design and Analysis of Computer Experiments," Statistical Science 4:4, 1989, 409-435.
M Salami, et al., "A fast evaluation strategy for evolutionary algorithms," Applied Soft Computing 2/3F (2003) 156-173.
J Torresen, "A Dynamic Fitness Function Applied to Improve the Generalisation when Evolving a Signal Processing Hardware Architecture," Proc. EvoWorkshops 2002, 267-299 (12 pp).
BA Whitehead, "Genetic Evolution of Radial Basis Function Coverage Using Orthogonal Niches," IEEE Transactions on Neural Networks, 7:6, (1996) 1525-28.
As Wu et al., "An incremental fitness function for partitioning parallel taks," Proc. Genetic and Evolutionary Computation Conf. (2001) 8pp.
Supplementary European Search Report dated Oct. 12, 2012 in EP 10770288.
Supplementary European Search Report dated Oct. 9, 2012 in EP 10770287.
Lopez Haimes et al., "MRMOGA: parallel evolutionary multi-objective optimization using multiple resolutions," In: Proceedings of IEEE Congress on Evolutionary Computation, 2294-2301, 2005.
Castillo Tapia et al. Applications of multi-objective evolutionary algorithms in economics and finance: A survey. IEEE Congress on Evolutionary Computation 2007: 532-539.
Bui et al. "Local Models: An Approach to Distributed Multi-objective Optimization, Computational Optimization and Applications." Computational Optimization and Application Journal, 2009, 42(1), 105-139.
Leon et al. Parallel Hypervolume-Guided Hyperheuristic for Adapting the Multi-objective Evolutionary Island Model. NICSO 2008: 261-272.
U.S. Appl. No. 13/895,238—Office Action dated Jan. 2, 2014, 17 pages.
Aug. 1, 2012 Office Action in U.S. Appl. No. 13/443,546, 12 pp.
Jun. 22, 2011 Office Action in U.S. Appl. No. 12/267,287, 16 pp.
Jul. 27, 2012 Final Office Action in U.S. Appl. No. 12/267,287, 14 pp.
AU 2010241594—Examination Report dated Oct. 8, 2013, 3 pages.
AU 2010241597—Examination Report dated Nov. 4, 2013, 4 pages.
Myers, R.H. and Montgomery, D.C., "Response Surface Methodology: Process and Product Optimization Using Designed Experiments," New York: John Wiley and Sons, Inc., 1995, pp. 1-700.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.
International Search Report dated Jul. 2, 2010 in PCT/US10/32847.
James Bradbury, et al., "Quasi-Recurrent Neural Networks," arXiv:1611.01576v2, Nov. 21, 2016, 11 pp.; Retrieved from the Internet: https//arxiv.org/pdf/1611.01576.pdf?fbclid=1wAR3hreOvBGmJZe54-631X49XedcbsQoDYIRu87BcCHEBf_vMKF8FDKK_7Nw.
Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved from the Internet: https://www.mitpressjounrals.org/doi/pdf/10.1162/tacl_a_00097.
International Search Report and Written Opinion for PCT Application No. PCT/US2019/017175, dated Jun. 5, 2019, 10 pp.
Fernando et al., "Pathnet: Evolution channels gradient descent in super neurai networks," arXiv preprint arXiv:1701.08734 (2017), 16 pages.
Yang et al., "Deep multi-task representation learning: A tensor factorisation approach," arXiv preprint arXiv:1605.06391 (2016), 12 pages.
Shazeer et al., "Outrageously large neural networks: The sparsely-gated mixture-of-experts layer," arXiv preprint arXiv:1701.06538 (2017), 19 pages.
Misra et al., "Cross-stitch networks for multi-task learning," In Proceedings of the IEEE Conference on Computer Vision and Pattern Recognition, pp. 3994-4003. 2016.
Miikkulainen, Risto, et al., "Evolving Deep Neural Networks," Mar. 4, 2017, 8 pp.
International Search Report and Written Opinion for Application No. PCT/US2018/064520, dated Mar. 4, 2019, 8 pp.
Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent/cgi?article=1751&context=ele_comeng_facwork.

* cited by examiner

US 11,507,844 B2

ASYNCHRONOUS EVALUATION STRATEGY FOR EVOLUTION OF DEEP NEURAL NETWORKS

PRIORITY DATA

This application claims the benefit of U.S. Provisional Patent Application No. 62/468,224, titled "ASYNCHRONOUS EVALUATION STRATEGY FOR EVOLUTION OF DEEP NEURAL NETWORKS", filed on Mar. 7, 2017. The provisional application is hereby incorporated by reference for all purposes.

INCORPORATIONS

The following materials are incorporated by reference as if fully set forth herein:

U.S. Nonprovisional patent application Ser. No. 15/794,913, titled "COOPERATIVE EVOLUTION OF DEEP NEURAL NETWORK STRUCTURES", filed on Oct. 26, 2017;

Risto Miikkulainen, Jason Zhi Liang, Elliot Meyerson, Aditya Rawal, Dan Fink, Olivier Francon, Bala Raju, Hormoz Shahrzad, Arshak Navruzyan, Nigel Duffy, and Babak Hodjat. Evolving deep neural networks. CoRR, abs/1703.00548, 2017. (Miikkulainen et al.);

U.S. Nonprovisional patent application Ser. No. 15/794,905, titled "EVOLUTION OF DEEP NEURAL NETWORK STRUCTURES", filed on Oct. 26, 2017;

U.S. Nonprovisional patent application Ser. No. 12/769,605, titled "CLASS-BASED DISTRIBUTED EVOLUTIONARY ALGORITHM FOR ASSET MANAGEMENT AND TRADING", filed on Apr. 28, 2010; and U.S. Nonprovisional patent application Ser. No. 14/011,062, titled "DATA MINING TECHNIQUE WITH FEDERATED EVOLUTIONARY COORDINATION", filed on Aug. 27, 2013.

FIELD OF THE TECHNOLOGY DISCLOSED

The technology disclosed is directed to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. The technology disclosed generally relates to evolving deep neural networks, and, in particular, relates to asynchronous evaluation strategies for evolving deep neural networks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Evolutionary algorithms have recently been used to evolve extremely complex systems such as deep neural networks, which are computationally expensive to evaluate (e.g., deep neural networks). Evaluation times may vary significantly between such systems. For instance, when evolving deep neural networks, fitness evaluation includes training the networks on large training sets using gradient optimization algorithms like backpropagation and/or reinforcement learning. A simple network such as a multilayer perceptron may be trained in a few minutes, but larger ones like Google's Inception may take several days on current graphics processing units (GPUs).

Fortunately such evolutionary applications can take good advantage of parallel supercomputing resources that have recently become available. Each evaluation can be done on a separate machine, and thus the whole population can be evaluated at the same time. However, when the evaluation times vary significantly, such a process can be inefficient. Even when some individuals are evaluated quickly, the evolutionary algorithms have to wait for the longest evaluation to finish before the next generation can be created. Depending on the distribution of evaluation times, most of the parallel machines may be idle during evolution, slowing down progress.

An opportunity arises to present an evaluation technique for evolutionary algorithms that takes full advantage of the available computational resources. Conservation of computational resources may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Evolutionary algorithms are a promising approach for optimizing highly complex systems such as deep neural networks, provided fitness evaluations of the networks can be parallelized. However, evaluation times on such systems are not only long but also variable, which means that many compute clients (e.g., worker nodes) are idle much of the time, waiting for the next generation to be evolved.

The technology disclosed proposes a novel asynchronous evaluation strategy (AES) that increases throughput of evolutionary algorithms by continuously maintaining a queue of K individuals ready to be sent to the worker nodes for evaluation and evolving the next generation once a fraction $M_i$ of the K individuals have been evaluated by the worker nodes, where $M_i \ll K$. A suitable value for $M_i$ is determined experimentally, balancing diversity and efficiency.

The technology disclosed is extended to coevolution of deep neural network supermodules and blueprints in the form of AES for cooperative evolution of deep neural networks (CoDeepNEAT-AES). Applied to image captioning domain, a threefold speedup is observed on 200 graphics processing unit (GPU) worker nodes, demonstrating that the disclosed AES and CoDeepNEAT-AES are promising techniques for evolving complex systems with long and variable evaluation times.

The disclosed AES achieves the same results as synchronous evolution, but does it several times faster. M (batch size) has a significant effect on this speedup. Too small batches are akin to too small populations: enough diversity is needed in the batch to allow evolution to progress well. On the other hand, evolution takes longer with larger batches. A simulated experiment in the 11-multiplexer domain, with runtimes set according to training times of evolved deep neural networks, suggests that an optimal batch size is roughly ¼ of the total population. Following this guideline, asynchronous evolution of deep learning neural networks in the image captioning task runs three times faster than synchronous evolution on a system with 200 GPUs. The disclosed AES is thus a promising tool for scaling up evolutionary simulations of complex structures to parallel supercomputing resources.

Asynchronous Evaluation Strategy (AES)

Figure 1:
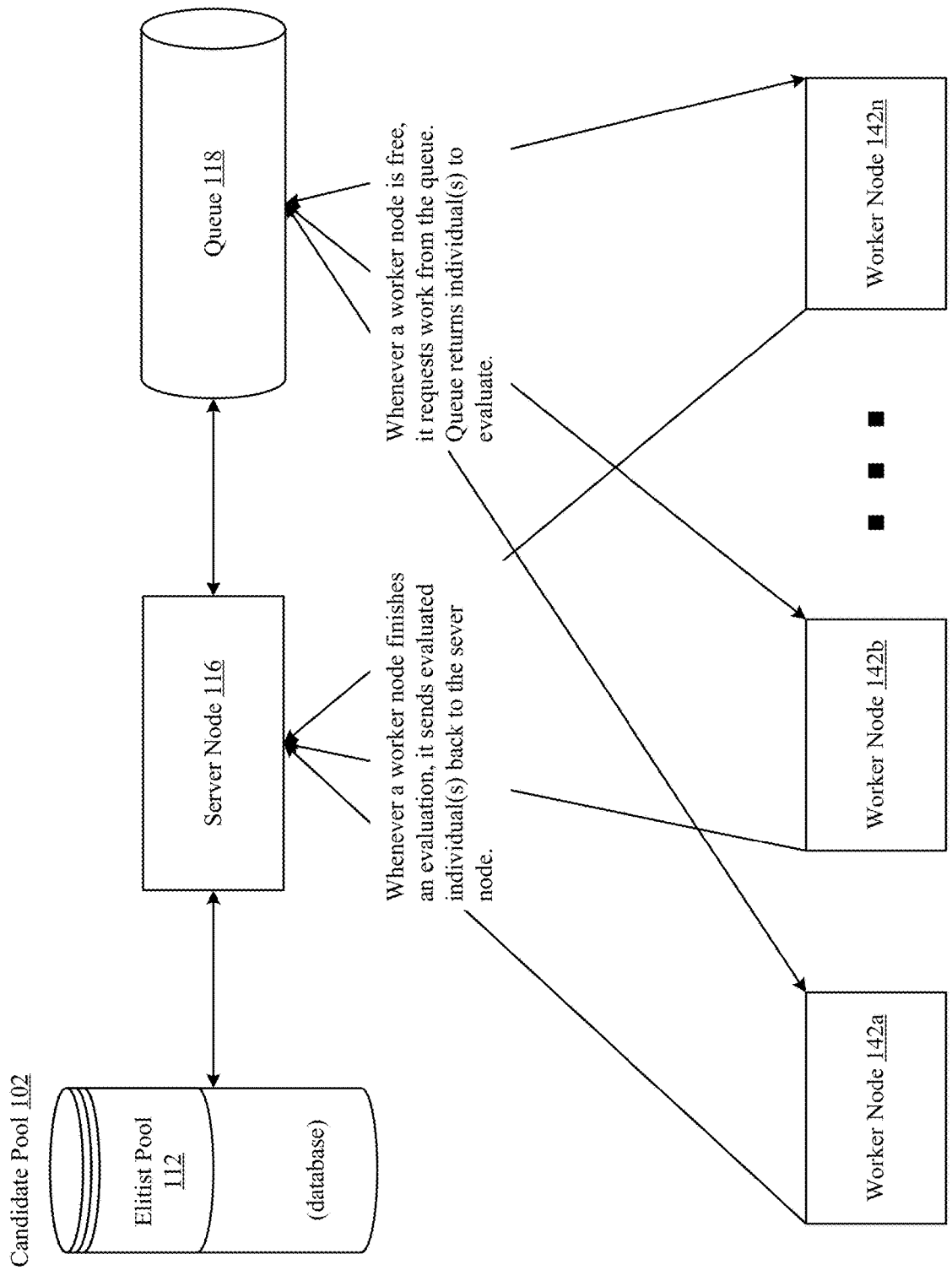
FIG. 1 shows one implementation of an environment in which the disclosed asynchronous evaluation strategy (AES) operates.

FIG. 1 shows one implementation of an environment 100 in which the disclosed asynchronous evaluation strategy (AES) operates. Environment 100 includes a candidate pool of individuals 102, a server node 116, a queue 118, and a plurality of worker nodes 142a-n.

Figure 5:
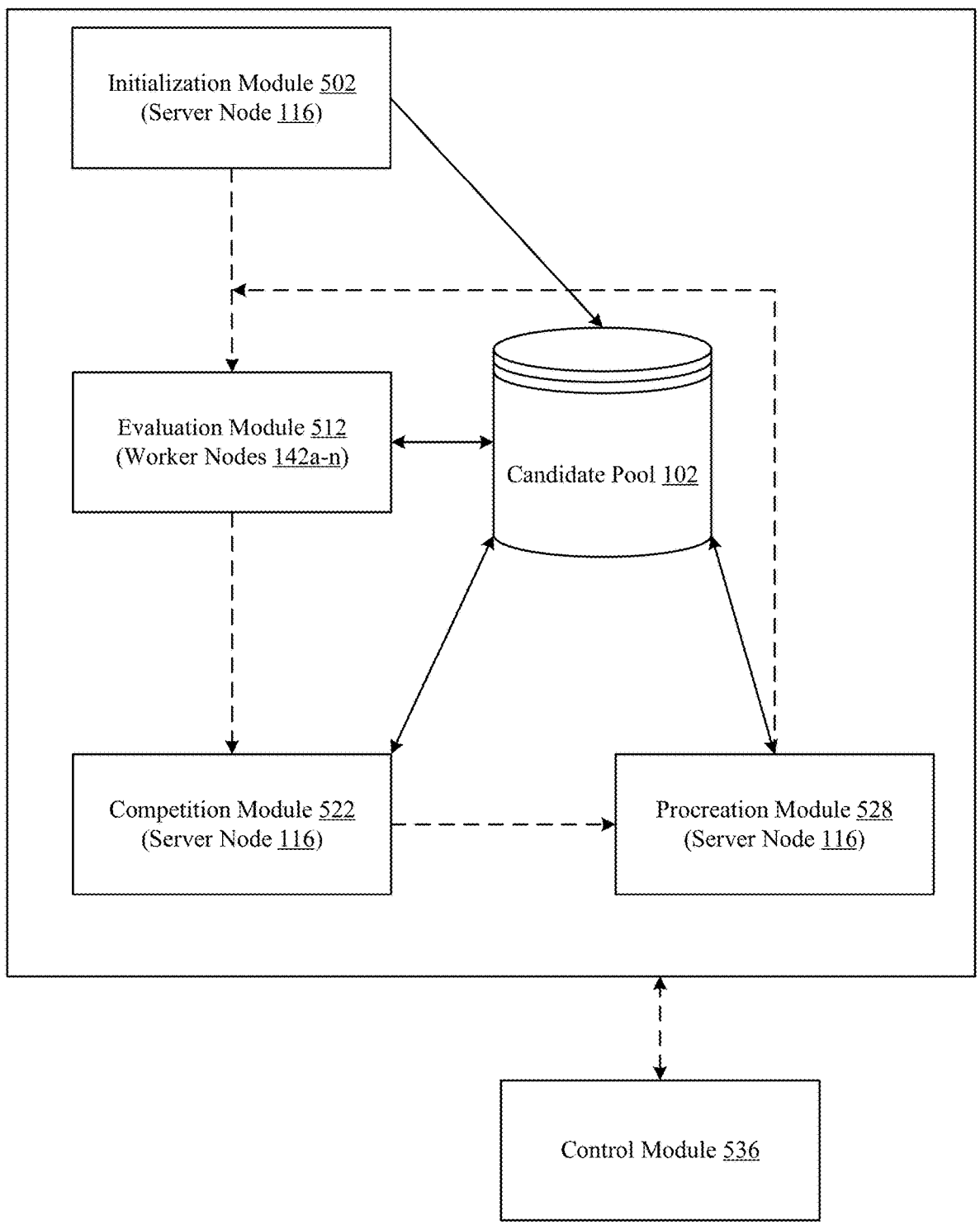
FIG. 5 depicts an example evolutionary algorithm accelerated by the technology disclosed using a server node and a plurality of worker nodes.

Environment 100 executes evolutionary algorithms such as the one shown in FIG. 5. Consider that evolutionary algorithm 500 comprises the following steps: (i) creating an initial population of individuals in the candidate pool 102, i.e., initialization, (ii) evaluating individuals in the candidate pool 102 to develop their respective fitness values, i.e., evaluation, (iii) selecting an elitist pool of individuals 112 from the candidate pool 102 based on the developed fitness values, i.e., competition, and (iv) producing new individuals from individuals in the elitist pool 112, i.e., procreation. Additional details about the evolutionary algorithm 500, and its variations, can be found in the incorporated application Ser. No. 12/769,605; Ser. No. 14/011,062; Ser. No. 15/794,913; and Ser. No. 15/794,905 and in the incorporated paper Miikkulainen et al.

Server node 116 comprises an initialization module 502, a competition module 522, and a procreation module 528 for performing the initialization, the competition, and the procreation respectively. Evaluation module 512 is implemented by the worker nodes 142a-n to perform only the evaluation. A control module 536 repeats (or iterates) the evaluation, the competition, and the procreation until a convergence condition is reached.

Server node 116 initializes the candidate pool 102 with an initial (i=0) population of K individuals, where K>2. Some examples of K include one million, hundred thousand, ten thousand, four thousand, one thousand, and one hundred. Server node 116 then distributes, via the queue 118, the initial population of K individuals among the worker nodes 142a-n for evaluation.

Server node 116 submits individuals that are ready for evaluation to the queue 118. Queue 118 can be a buffer that receives individuals from the server node 116 and makes the received individuals available to the worker nodes 142a-n for evaluation. Queue 118 can also be a completion service which provides a common application programming interface to the server node 116 and the worker nodes 142a-n such that the server node 116 can push individuals onto the buffer and the worker nodes 142a-n can pull individuals from the buffer.

A worker node evaluates an individual by measuring a fitness value of the individual. Fitness value is specific to the environment and goals of the particular application. For example, when the individual is a deep neural network, the fitness value may be based on the predictive value of the network as assessed against the ground truth data—the more often the network correctly predicts the result represented in the ground truth data, the more fit the network is considered. In a financial asset trading environment, an individual might provide trading signals (e.g., buy, sell, hold current position, exit current position), and the fitness value may be measured by the individual's ability to make a profit, or the ability to do so while maintaining stability, or some other desired property. In the healthcare domain, an individual might propose a diagnosis based on the patient's prior treatment and current vital signs, and the fitness value may be measured by the accuracy of the diagnosis.

Worker nodes 142a-n only evaluate the individuals and do not perform any competition or procreation. In other words, the worker nodes 142a-n evaluate all the individual distributed to them by the server node 116 and return back to the server node 116 all the evaluated individuals, without discarding any individuals or procreating new individuals. The evaluated individuals can be returned at different times and in different batches. One example of worker nodes 142a-n includes graphics processing units (GPUs) running on a cloud computing service like Amazon EC2. Environment 100 can include hundreds of thousands of such worker nodes.

Whenever a worker node is free, it requests work from the queue 118. Queue 118 responds by sending individual(s) for evaluation. In one implementation, the worker node receives only one individual. In another implementation, it receives a batch of individuals.

Whenever a worker node finishes an evaluation, it returns evaluated individual(s) and their respective fitness values back to the server node 116. In one implementation, it returns them individually. In another implementation, it returns a batch of them at a time.

In various implementations, the batch sizes may or may not be the same in both directions. And in various embodiments the batch sizes in a particular one of the directions may or may not be constant for all batches.

When synchronous evaluation strategies are used to run evolutionary algorithms in a distributed environment like environment 100, they can create bottlenecks in the evolution. For example, evaluation bottleneck occurs when the server node 116 has to wait for the worker nodes 142a-n to finish evaluating all of the K individuals before the server node 116 can evolve the next generation. Since often there is high variance in evaluation times of the individuals (e.g., due to varying amount of time required to train deep neural networks of different depth and complexity), evaluation frequently becomes bottlenecked while the server node 116 is waiting for the slowest individuals (i.e., ones requiring longest evaluation times) to be evaluated by the worker nodes 142a-n. Moreover, those ones of the worker nodes 142a-n that have finished evaluating the fastest individuals (i.e., ones requiring shortest evaluation times) remain idle until the next generation is evolved and distributed.

The disclosed asynchronous evaluation strategy (AES) removes the evaluation bottleneck by providing a constant supply of individuals ready to be evaluated. As a result, the worker nodes 142a-n have optimal throughput and minimal idle time because they are able to immediately pull new individuals from the queue 118 after evaluating the existing ones. Second, the disclosed AES minimizes the server idle time by immediately proceeding to the next generation once a small fraction of the total number of individuals sent for evaluation have returned. As a result, the server node 116 does not have to wait for the slowest individuals because evolution of the next generation's population can begin once a sufficient number of fitness evaluations have returned. In this manner, all available computational resources are used at all times. On the other hand, the process is no longer strictly generational, since individuals from several different generations may be evaluated in parallel.

Furthermore, since the number of individuals in the queue 118 greatly exceeds the number of individuals used to evolve the next generation, it is not scalable to have the server node 116 keep track of all the individuals that are in the queue 118 and that are being evaluated by the worker nodes 142a-n. The solution to this problem is to shift the burden of bookkeeping to the worker nodes 142a-n. After the server node 116 places all the individuals that need to be evaluated in the queue 118, the server node 116 no longer keeps track of them. Instead, the worker nodes 142a-n return back to the server node 116 both the fitness values and the corresponding individuals together.

In some implementations, as a completion service, the queue 118 provides both: the buffer to which the server node 116 can submit individuals and a channel for the worker nodes 142a-n to return evaluated individuals to the server node 116. Server node 116 then updates or overwrites the candidate pool 102 with the newly returned individuals and their corresponding fitness values.

The following pseudocode is one implementation of the disclosed asynchronous evaluation strategy (AES):
(1) Create an initial population of K individuals in the candidate pool.
(2) Distribute the K individuals to the worker nodes for evaluation.
(3) Wait for Mi evaluated individuals and their fitness values to return, where Mi=K/D, D>1.
(4) Upon receiving the Mi evaluated individuals and their fitness values, overwrite the candidate pool with the Mi evaluated individuals.
(5) Evolve next generation's population of Ni individuals, where Ni=Mi.
(6) Repeat from (2).

In the pseudocode above, K is the initial population size, Mi is the number of evaluated individuals to wait for, Ni is the population size of subsequent generations, and D is a hyperparameter which controls the ratio between K and Mi.

Figure 2:
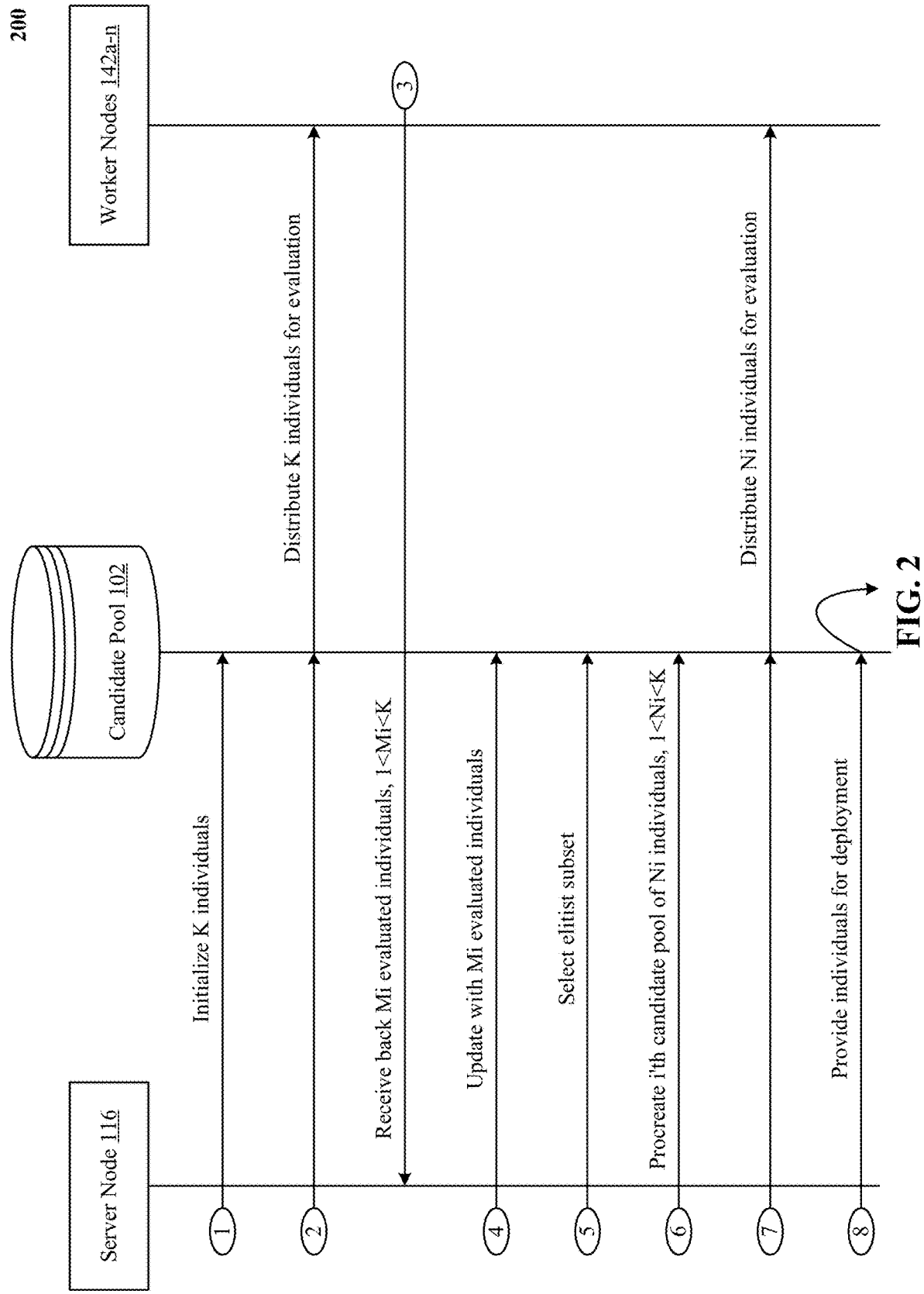
FIG. 2 is one implementation of accelerated evolution of individuals using the disclosed AES.

FIG. 2 is one implementation 200 of accelerated evolution of individuals using the disclosed AES. The individuals solve a provided problem using the plurality of worker nodes 142a-n.

At action 1, the server node 116 stores an initial (i=0) population of K individuals in the candidate pool 102. The candidate pool 102 is maintained in memory.

At action 2, the server node 116 distributes the initial population of K individuals among the worker nodes 142a-n for evaluation. While the asynchronous nature of implementations herein can be used in environments in which the amount of time needed to evaluate different individuals is relatively constant across the individuals, the most benefit is obtained if the population of individuals is such that the time required to evaluate them can vary significantly. Preferably the time required to evaluate an individual during the evaluation varies among the K individuals in the initial population by a factor of at least 10.

In each i'th generation in a plurality of generations, beginning with a first (i=1) generation, the server node 116 receives back evaluated individuals from the worker nodes 142a-n. Each of the evaluated individuals is returned with a respective fitness value. At action 3, the server node 116 receives back Mi individuals from the worker nodes 142a-n, where 1<Mi<K. Mi=K/D, D>1 for each of the generations in the plurality of generations. The choice of Mi, the number of returned individuals to await before processing them, depends on the problem to be solved by the genetic algorithm, and the nature of the individuals, and preferably it is predetermined through an optimization process. In general, however, the number Mi should be significantly less than K, because otherwise very little benefit will be obtained compared to awaiting the return of all K individuals. On the other hand, Mi should be at least 2, since otherwise no benefit will be obtained compared to a non-batched method. Preferably Mi should be large enough to form a "population" in itself, from which an elitist pool can be selected, which is then large enough to support sufficient diversity for useful procreation. A minimum Mi for this purpose is approximately Mi≥20. This minimum should be observed for each of the generations in the plurality of generations. Note that in various implementations, Mi can differ in different generations. For example, Mi can vary in dependence upon how well the evolutionary algorithm has proceeded so far, or whether the number of worker nodes has changed. In other implementations, however, Mi is predetermined at initialization and remains constant until the end.

At action 4, the server node 116, in response to receiving back the Mi individuals, updates the candidate pool 102 with the Mi returned individuals.

At action 5, the server node 116 selects an elitist subset of the Mi individuals in the candidate pool 102 in dependence upon their respective fitness values.

At action 6, the server node 116 procreates individuals in the elitist subset to produce an i'th candidate pool of Ni individuals, where 1<Ni<K. Ni=Mi for each of the generations in the plurality of generations, according to one implementation, but in another implementation Ni can be made different than Mi, to accommodate the possibility that the number of individuals to be distributed for evaluation in one generation might differ from the number of returned individuals for which the server node waited in that generation. In one implementation the server discards the parents (i.e. the individuals in the elitist subset) after procreation, so that all Ni individuals are new. In another implementation the server retains the parents, so that the Ni individuals in each i'th candidate pool include the elitist subset from the i'th generation. For the same reasons as set forth above with respect to action 2, preferably the time required to evaluate an individual during the evaluation varies among the Ni individuals from the i'th candidate pool by a factor of at least 10.

At action 7, the server node 116 distributes among the worker nodes 142*a-n* for evaluation, the Ni individuals from the i'th candidate pool.

At action 8, the server node 116, after the plurality of generations, provides individuals from the candidate pool 102 for deployment.

This implementation optionally includes one or more of the following features.

It can be seen that because of the asynchronous nature of the method, in a particular j'th one of the generations, Mj individuals received back from the worker nodes 142*a-n* can include at least two individuals that had been distributed for evaluation from different generations of the candidate pool 102.

Similarly, in a particular j'th one of the generations, Nj individuals distributed among the worker nodes 142*a-n* can include at least two individuals from different generations of the candidate pool 102.

The evolution of individuals comprises evolution of deep neural networks to solve the provided problem. Each individual distributed among the worker nodes 142*a-n* defines a respective deep neural network.

The evolution of individuals comprises evolution of neural network supermodules and neural network blueprints having slots for selected ones of the supermodules. Each individual distributed among the worker nodes 142*a-n* defines a respective blueprint and a respective arrangement of supermodules for the slots of the blueprint.

Implementation 200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 2. Multiple actions can be combined in some implementations. For convenience, implementation 200 is described with reference to the system that carries out a method. The system is not necessarily part of the method.

Each of the features discussed in this application for other implementations apply equally to this implementation. All the other features are not repeated here and should be considered repeated by reference. Other implementations may include a non-transitory computer readable storage medium storing instructions executable by a processor to perform actions of this implementation.

In yet another implementation, a method of accelerating evolution of individuals that solve a provided problem is disclosed.

The method includes providing for evaluation an initial set of K individuals, where K>2.

At each i'th one of a plurality of generations, in response to receiving back a current generation of Mi of the individuals provided for evaluation, the method includes evolving in dependence upon the received Mi individuals a respective set of Ni individuals for a next one of the generations and providing for evaluation the set of Ni individuals.

For each of the generations in the plurality of generations, 1<Mi<K and 1<Ni<K.

The evolving further includes selecting an elitist subset of the Mi individuals in dependence upon their respective fitness estimates and procreating individuals in the elitist subset to produce the Ni individuals.

Each of the features discussed in this application for other implementations apply equally to this implementation. All the other features are not repeated here and should be considered repeated by reference. Other implementations may include a non-transitory computer readable storage medium (CRM) storing instructions executable by a processor to perform the method described above. Yet another implementation may include a system including memory and one or more processors operable to execute instructions, stored in the memory, to perform the method described above.

AES for Cooperative Evolution of Deep Neural Networks (CoDeepNEAT-AES)

Deep neural networks have shown state of the art performance on many machine learning tasks like computer vision, speech recognition, and natural language processing. Often, the hyperparameter choice and the structure of the network have a massive impact on its performance. As result, much research effort has been spent into discovering better architectures.

Recently, evolutionary algorithms have been proposed as a viable way to automatically optimize the architecture and hyperparameters of a deep neural network. In particular, a novel evolutionary algorithm called CoDeepNEAT efficiently explores the search space for potential deep neural network topologies. Additional details about CoDeepNEAT can be found in the incorporated application Ser. No. 15/794,913 and Ser. No. 15/794,905 and in the incorporated paper Miikkulainen et al.

CoDeepNEAT uses blueprints and supermodules to assemble networks by filling slots in the blueprints with corresponding supermodules. A blueprint is a graph in which each slot identifies a particular supermodule species. A supermodule is a graph in which each node identifies a module. A module identifies a deep neural network and its corresponding hyperparameters (e.g., number of neurons, activation function, etc.). Populations of blueprints and supermodules are evolved separately.

Figure 6:
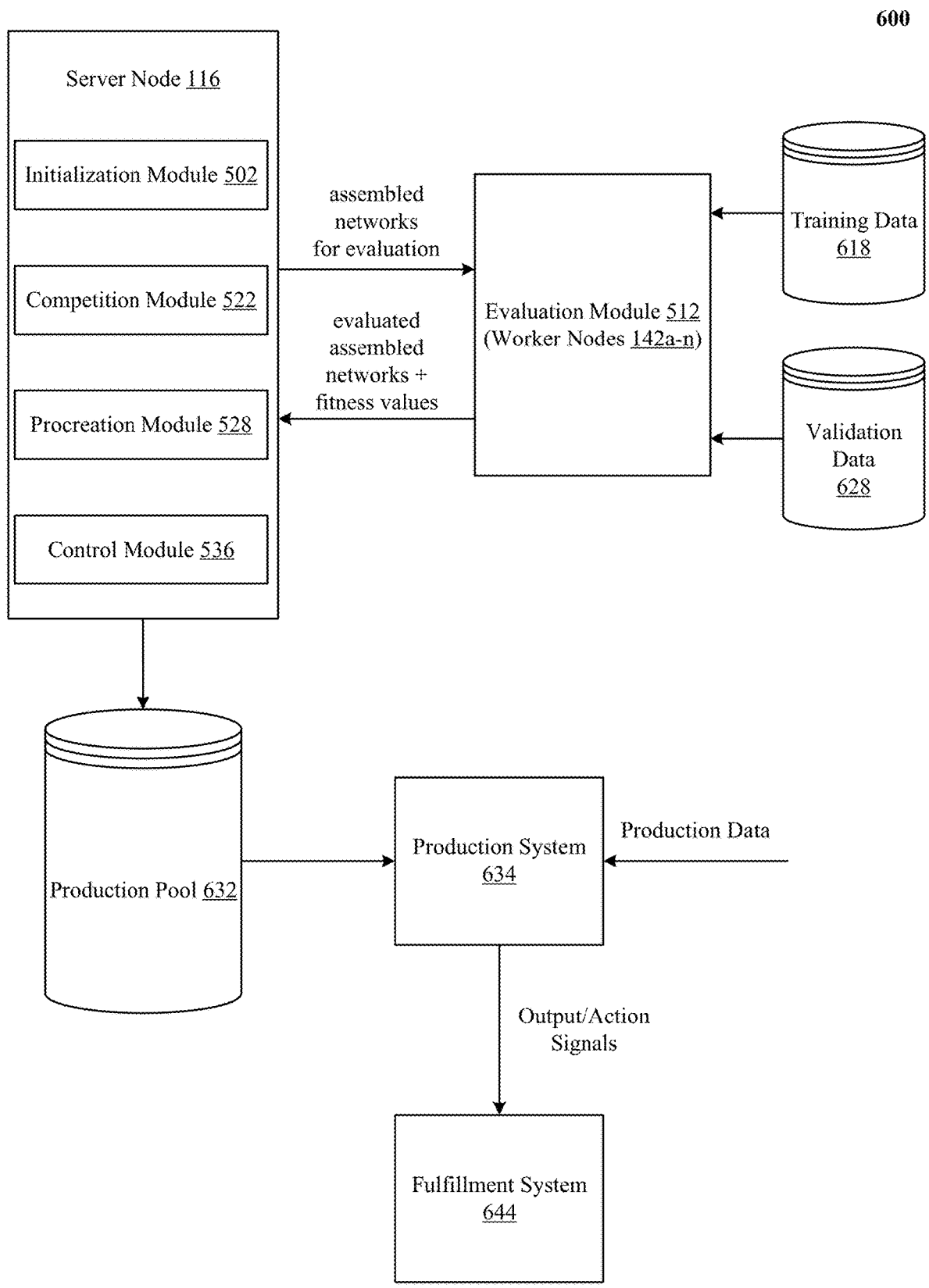
FIG. 6 illustrates the division of processing steps between the server node and the plurality of worker nodes during the example evolutionary algorithm of FIG. 5. The worker nodes perform only the evaluation step of the evolutionary algorithm while the server node performs most other steps of the evolutionary algorithm, including initialization, competition, and procreation.

As shown in FIG. 6, the assembled networks are evaluated by the worker nodes 142*a-n*. Evaluation includes using training data 618 to train the assembled networks on a supervised learning task like image classification or machine translation, determining the performance of the trained networks on validation data 628, and assigning them fitness values based on their performance. The fitness values of the assembled networks are attributed to the underlying blueprints and supermodules. One confirmation of the effectiveness of CoDeepNEAT is that it discovers by evolution some of the modular, repetitive structures that also appear in state of the art networks such as GoogLeNet and ResNet.

Figure 3:
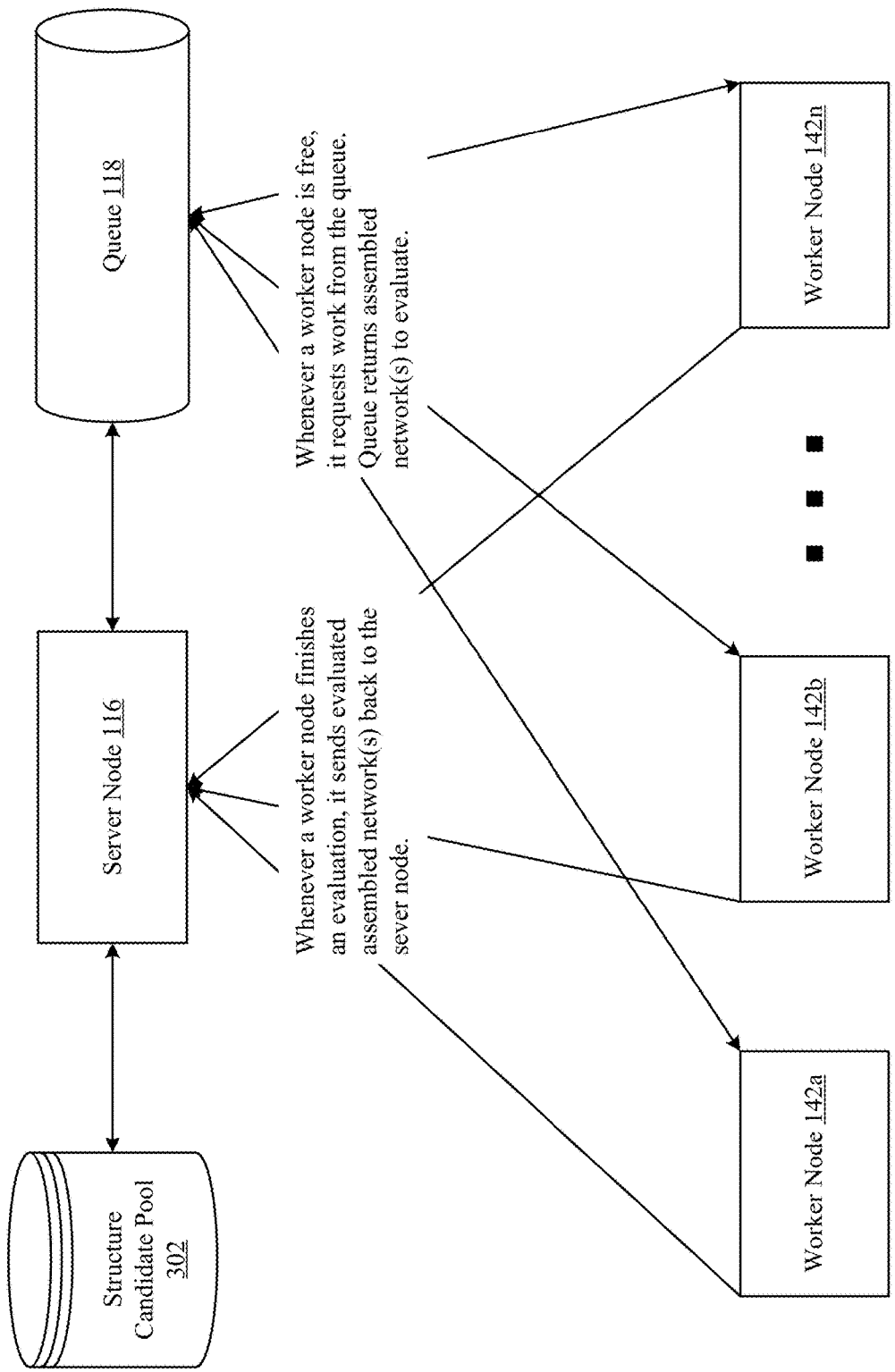
FIG. 3 shows one implementation of an environment in which the disclosed AES for cooperative evolution of deep neural networks (CoDeepNEAT-AES) operates.

FIG. 3 shows one implementation of an environment 300 in which the disclosed AES for cooperative evolution of deep neural networks (CoDeepNEAT-AES) operates. Architecturally, environment 300 is similar to environment 100 such that the server node 116 and the worker nodes 142a-n use the queue 118 to exchange the assembled networks as individuals. As part of CoDeepNEAT-AES, the server node 116 operates on structure candidate pool 302 to separately evolve a blueprint population and a plurality of supermodule subpopulations. The blueprint population is maintained in a blueprint candidate pool 404 and the supermodule subpopulations are maintained in a supermodule candidate pool 406. In one implementation, a population of the assembled networks is maintained in an assembled network pool 402. In some implementations, pools 402, 404, and 406 are maintained in the structure candidate pool 302. Note that as used herein, the terms "database" and "pool" do not necessarily imply any unity of structure. For example, two or more separate databases or pools, when considered together, still constitute a "database" or "pool" as those terms are used herein. Thus, for example, the pools 402, 404, and 406 may not necessarily be stored separately in the structure candidate pool 302 in all implementations; in some implementations they may be stored together in a unified structure in pool 302.

The following pseudocode is one implementation of the disclosed CoDeepNEAT-AES:

(1) Initialize blueprint population and supermodule subpopulations.
(2) Generate K assembled networks from the blueprints and the supermodules; store the K assembled networks in the assembled network pool (optional).
(3) Distribute the K assembled networks, along with the underlying blueprints and supermodules, to the worker nodes for evaluation.
(4) Wait for Mi evaluated assembled networks and their fitness values to return, where Mi=K/D, D>1.
(5) Upon receiving the Mi evaluated assembled networks and their fitness values, overwrite the assembled network pool with the Mi evaluated assembled networks (optional).
(6) Assign the underlying blueprint and supermodules of the Mi evaluated assembled networks the fitness values of their corresponding evaluated assembled networks.
(7) Group together the underlying blueprint and supermodules of the Mi evaluated assembled networks and filter out duplicates to identify unique blueprints and supermodules.
(8) Merge the unique blueprints and supermodules with the existing blueprint population and supermodule subpopulations.
(9) Evolve next generation's population of Ni assembled networks, where 1<Ni<K.
(10) Repeat from (2).

Figure 4:
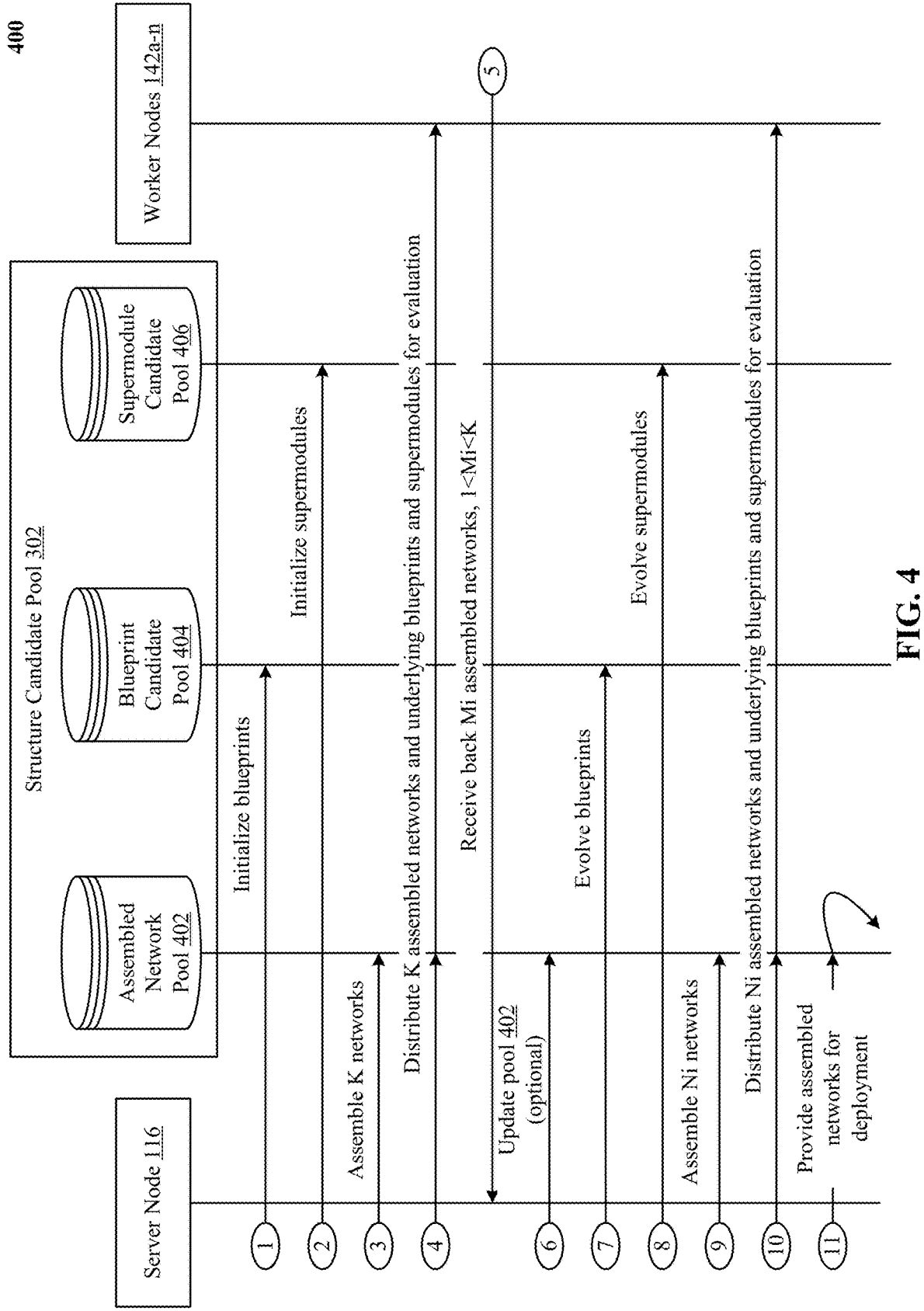
FIG. 4 is one implementation of accelerated evolution of deep neural networks using the disclosed CoDeepNEAT-AES.

FIG. 4 is one implementation 400 of accelerated evolution of deep neural networks using the disclosed CoDeepNEAT-AES. The deep neural networks solve a provided problem using the plurality of worker nodes 142a-n.

At actions 1 and 2, the server node 116 stores in the structure candidate pool 302 an initial (i=0) population of neural network supermodules and an initial (i=0) population of K neural network blueprint structures. Each of the blueprint structures has slots for selected ones of the supermodules. The structure candidate pool 302 is maintained in memory.

At action 3, the server node 116 assembles an initial population of K assembled networks. Each of the assembled networks identifies a respective one of the blueprints and a corresponding arrangement of the supermodules from the structure candidate pool 302 for the slots of the respective assembled network.

At action 4, the server node 116 distributes among the worker nodes 142a-n for evaluation, the initial population of K assembled networks and the underlying blueprints and supermodules.

In each i'th generation in a plurality of generations, beginning with a first (i=1) generation, the server node 116 receives back from the worker nodes 142a-n, evaluated ones of the assembled networks previously distributed to the worker nodes 142a-n for evaluation. Each of the evaluated networks is returned with a respective fitness value. At action 5, the server node 116 receives back Mi assembled networks from the worker nodes 142a-n, where 1<Mi<K. Mi=K/D, D>1 for each of the generations in the plurality of generations, according to another implementation. Mi≥20 for each of the generations in the plurality of generations.

In some implementations, the memory can further store in the structure candidate pool 302 assembled networks that have been distributed among worker nodes 142a-n for evaluation. In such implementation, at action 6, the server node 116 updates the structure candidate pool 302 by: (i) for each returned assembled network which exists in the structure candidate pool 302, assigning the fitness value of the returned assembled network to the corresponding assembled network in the structure candidate pool 302 and (ii) for each returned assembled network which does not exist in the structure candidate pool 302, storing the returned assembled network in the structure candidate pool 302 in association with the fitness value of the returned assembled network.

At actions 7 and 8, the server node 116, in response to receiving back the Mi assembled networks, updates: (i) the blueprints in the structure candidate pool 302 with the blueprints of each of the Mi returned assembled networks and (ii) the supermodules in the structure candidate pool 302 with the supermodules of the Mi returned assembled networks.

At action 9, the server node 116 evolves an i'th generation structure candidate pool 302 of neural network supermodules and an i'th population of neural network blueprint structures in dependence upon respective blueprint and supermodule fitness values, where 1<Ni<K. Ni=Mi for each of the generations in the plurality of generations, according to another implementation.

At action 10, the server node 116 distributes Ni assembled networks among the worker nodes 142a-n for evaluation, where 1<Ni<K. Ni=Mi for each of the generations in the plurality of generations, according to another implementation. Each of the assembled networks distributed in the i'th generation identifies a respective one of the blueprints from the i'th structure candidate pool 302 and a respective arrangement of the supermodules from the i'th structure candidate pool 302 for the slots of the respective assembled network.

At action 11, the server node 116, after the plurality of generations, provides assembled networks from components in the structure candidate pool 302 for deployment.

This implementation optionally includes one or more of the following features.

Updating the blueprints in the structure candidate pool 302 with the blueprints of each of the Mi returned assembled networks comprises: (i) for each returned assembled network the blueprint of which exists in the structure candidate pool 302, assigning the fitness value of the returned assembled network to the corresponding blueprint in the structure candidate pool 302 and (ii) for each returned assembled network the blueprint of which does not exist in the structure candidate pool 302, storing the blueprint of the returned assembled network in the structure candidate pool 302 in association with the fitness value of the returned assembled network.

Updating the supermodules in the structure candidate pool 302 with the supermodules of the Mi returned assembled networks comprises: (i) for each first unique supermodule in the returned assembled networks, which first supermodule exists in the structure candidate pool 302, associating a respective fitness value to the corresponding supermodule in the structure candidate pool 302 and (ii) for each second unique supermodule in the returned assembled networks, which second supermodule does not exist in the structure candidate pool 302, storing the second unique supermodule in the structure candidate pool 302 in association with a respective fitness value.

The respective fitness value to be associated with each unique supermodule in the structure candidate pool 302 is a merged version of the fitness values returned with each of the returned assembled networks that include the respective unique supermodule.

The merged version of the fitness values returned with each of the returned assembled networks that include the respective unique supermodule is an average of the fitness values returned with each of the returned assembled networks that include the respective unique supermodule.

In each i'th generation in the plurality of generations, evolving the i'th population of Ni neural network blueprint structures comprises: (i) selecting a blueprint elitist subset of the blueprints in the updated structure candidate pool 302 in dependence upon fitness values associated with the blueprints and (ii) procreating blueprints from the blueprint elitist subset. In each i'th generation in the plurality of generations, evolving the i'th population of Ni neural network blueprint structures further comprises discarding from the structure candidate pool 302 all blueprints not in the elitist subset of blueprints and not among the blueprints procreated from the blueprint elitist subset. In each i'th generation in the plurality of generations, evolving the i'th generation of neural network supermodules for the structure candidate pool 302 comprises: (i) selecting a supermodule elitist subset of the supermodule in the updated structure candidate pool 302 in dependence upon fitness values associated with the supermodule and (ii) procreating supermodule from the supermodule elitist subset.

Each of the worker nodes 142a-n includes a local memory storing a respective subset of the assembled networks distributed to the worker nodes 142a-n for evaluation. The evaluation includes: (i) training the each of the assembled networks in the local memory on training data, (ii) evaluating the trained assembled networks on validation data to develop a fitness value for each of the assembled networks, and (iii) returning each of the evaluated assembled networks toward the server node server node 116 with the fitness value developed in the evaluation.

The time required to train an assembled network on the training data 618 varies among the K assembled networks in the initial population by a factor of at least 10. The time required to train an assembled network on the training data varies 618 among the Ni assembled networks from the i'th candidate pool by a factor of at least 10.

Implementation 200 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 2. Multiple actions can be combined in some implementations. For convenience, implementation 200 is described with reference to the system that carries out a method. The system is not necessarily part of the method.

Each of the features discussed in this application for other implementations apply equally to this implementation. All the other features are not repeated here and should be considered repeated by reference. Other implementations may include a non-transitory computer readable storage medium storing instructions executable by a processor to perform actions of this implementation.

FIG. 6 illustrates the division 600 of processing steps between the server node 116 and the plurality of worker nodes 142a-n during the example evolutionary algorithm 500. The worker nodes 142a-n perform only the evaluation step of the evolutionary algorithm while the server node 116 performs most other steps of the evolutionary algorithm, including initialization, competition, and procreation.

Production system 634 operates according to a production pool 632, which is populated by individuals (or deep neural networks) deployed by the server node 116 after a plurality of generations. Production system 634 applies individuals in the production pool 632 to production data, and produces outputs, which may be action signals or recommendations. Fulfillment system 644 is a system that is controlled automatically by the signals from the production system 634.

Experimental Results

We first adapt the disclosed AES to work with EC-STAR, a distributed genetic programming (GP) platform that is scalable to hundreds of thousands of worker nodes. Since the EC-STAR platform is mature and is capable of performing multiple evolutionary runs at the same time, it serves as a sanity check on whether the disclosed AES improves performance when there is a wide variance in evaluation times and as a way to determine the optimal hyperparameter value of D. In particular, we use EC-STAR with the disclosed AES to optimize the 11-multiplexer problem and analyze how different values of D affect performance. After determining the optimal value of D, we use a similar value for the disclosed CoDeepNEAT-AES experiments on the image captioning domain.

Multiplexer Domain

Multiplexer functions have long been used to evaluate machine learning methods because they are difficult to learn but easy to check. In general, the input to the multiplexer function includes u address bits $A_v$ and $2^u$ data bits $D_v$, i.e., it is a string of length $u+2^u$ of the form $A_{u-1} \ldots A_1 A_0 D_{2^u-1} \ldots D_1 D_0$. The value of the multiplexer function is the value (0 or 1) of the particular data bit that is singled out by the u address bits. For example, for the 11-Multiplexer, where u=3, if the three address bits $A_2 A_1 A_0$ are 110, then the multiplexer singles out data bit number 6 (i.e., $D_6$) to be its output. A Boolean function with $u+2^u$ arguments has $2^{u+2^u}$ rows in its truth table. Thus, the sample space for the Boolean multiplexer is of size $2^{u+2^u}$. When u=3, the search space is of size $2^{2^{11}}=2^{2048}\cong10^{616}$. However, since evolution can also generate redundant expressions that are all logically equal, the real size of the search space can be much larger, depending on the representation.

An example rule-based representation is used in which each candidate specifies a set of rules of the type:

<rule>::=<conditions>→<action>.

The conditions specify values on the bit string and the action identifies the index of the bit whose value is then output. For instance, the following rule outputs the value of data bit 6 when the first three bits are 110:

<$A_0$=0 & $A_1$>=1 & !$A_2$=0>→$D_6$.

These rules are evolved through the usual genetic operators in genetic programming. Note that with this definition, although logical OR is not explicitly represented in the grammar, it is conceivable that we can have several rules with the same action. This is equivalent to a logical OR and allows the representation to be functionally complete. In other words, the grammar above, which includes the AND, OR and NOT operators, can be used to express all possible Boolean functions. This system can produce a range of genes, from only a single condition rule, up to the maximum number of rules and conditions allowed per configuration.

In the experiments, the maximum number of rules is set to 256 and maximum number of conditions per rule is also set to 64. What makes this problem a good fit testing the disclosed AES is its nature of starting from simple and gradually becoming complex, which is similar to how CoDeepNEAT evolves neural networks. Furthermore, multiplexer individuals also need a base level of complexity in order to become a perfect solution and that is somewhat analogous to performance of neural networks in the sense that although some complexity is necessary for a high performing network, there is no linear correlation between complexity and performance.

Figure 7:
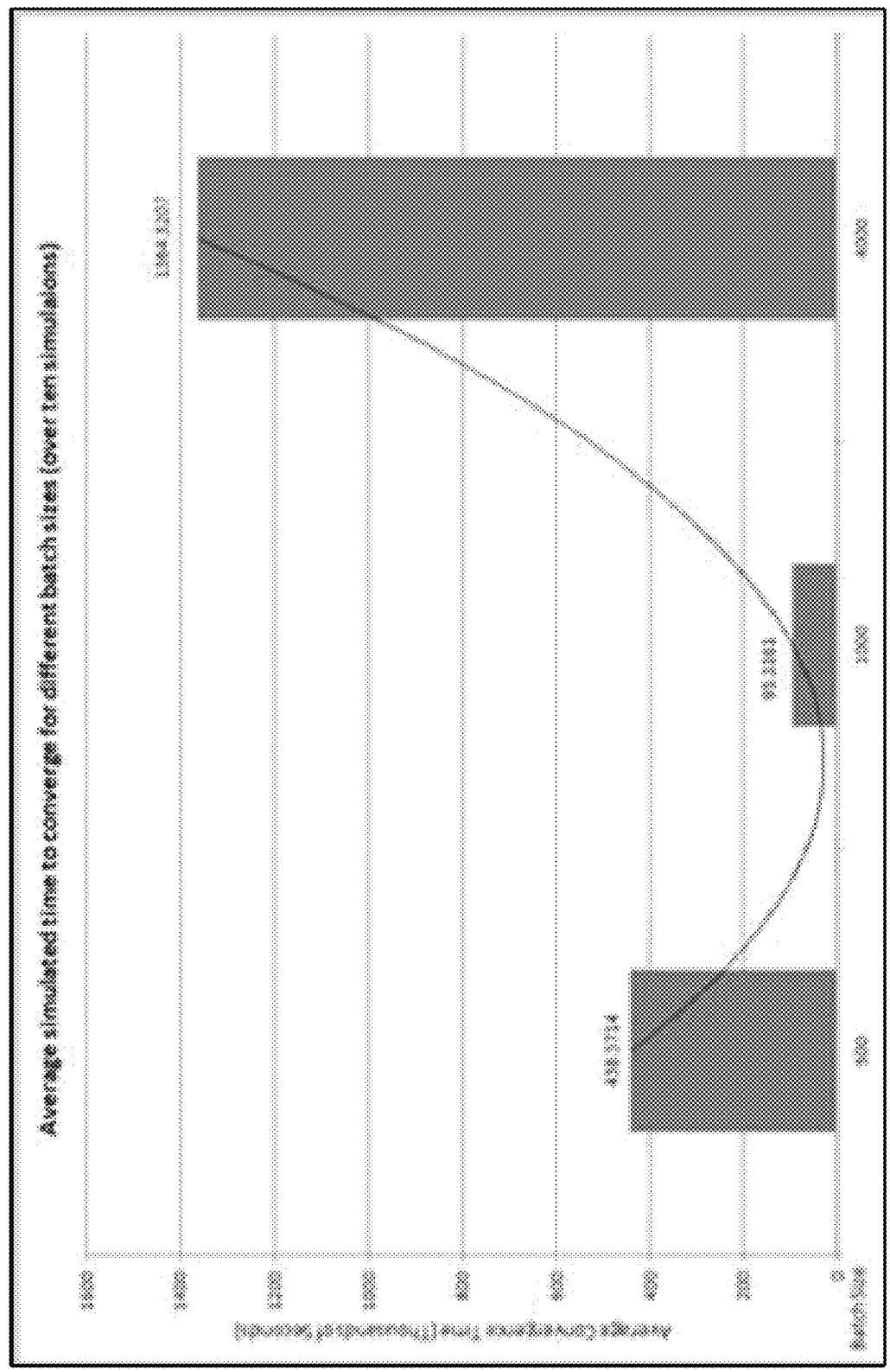
FIG. 7 shows an overview of how different values of M affect the convergence time on a multiplexer domain.

Because every fitness evaluation in the multiplexer domain takes a similar amount of time, an artificial delay is added to the end of every evaluation. The amount of delay is modeled after the evaluation timings of an actual run of CoDeepNEAT on the CIFAR-10 image classification domain. We fit two linear regression models on a scatterplot of (i) the mean evaluation time vs the number of generations elapsed and (ii) the standard deviation of evaluation time vs the number of generations elapsed. During each generation of EC-Star, we use the two linear models to predict appropriate mean and standard deviation values; these values are used to construct a Gaussian distribution from which the delays for fitness evaluations are sampled from. For our experiments, we set K to 4000, try different values of M (such as 500, 1000, 4000) and record the amount time necessary for EC-Star to converge and solve the multiplexer problem in each case. To reduce noise, the experiments are repeated 10 times for each value of M. The results are summarized in FIG. 7, which plots convergence time versus different M. Interestingly, setting M to an extremely low or high value can hurt performance. In cases where M=1000, evolution shows the most substantial speedups (up to 13 times), thus indicating that D=4 seems to be the optimal value for the hyperparameter.

Image Captioning Domain

Deep learning has recently provided state-of-the-art performance in image captioning, and several diverse architectures have been suggested. The input to an image captioning system is a raw image, and the output is a text caption intended to describe the contents of the image. In many popular architectures, a convolutional network may be used to process the image into an embedding. This image embedding is then given to recurrent layers such as LSTMs to generate coherent sentences with long-range dependencies.

As is common in existing approaches, a pre-trained ImageNet model is used to produce initial image embeddings. The evolved network takes an image embedding as input, along with a sequence one-hot text input. During training the text input contains the previous word of the ground truth caption; in inference it contains the previous word generated by the model. In the initial CoDeepNEAT population, the image and text inputs are fed to a shared embedding layer, which is densely connected to a softmax output over words. From this simple starting point, CoDeepNEAT evolves architectures that include fully-connected layers, LSTM layers, sum layers, concatenation layers, and sets of hyperparameters associated with each layer, along with a set of global hyperparameters. In fact, the well-known Show and Tell image captioning architecture is in this search space.

For comparison purposes, two separate runs of CoDeepNEAT for evolving DNNs on the image captioning domain are performed, both with and without AES. To keep the computational costs reasonable, during evolution the networks are trained for six epochs, and on one-fifth of the entire MSCOCO image captioning dataset. For both experiments runs, we use identical hyperparameters and set a population size of 100 for the synchronous version of CoDeep-NEAT. For CoDeepNEAT-AES, we set K=300 and M=100 (D=3). The worker nodes are composed of up to 200 Amazon EC2 spot instances (with GPU support for training DNNs) and the completion service provides the interface between them and the server. Due to cost concerns of running so many EC2 instances, a smaller value of D=3 is used. Because EC2 spot instances are inherently unreliable and may be temporary unavailable for any reason, both experiments are started at the same time to remove a potential source of bias.

Figure 8:
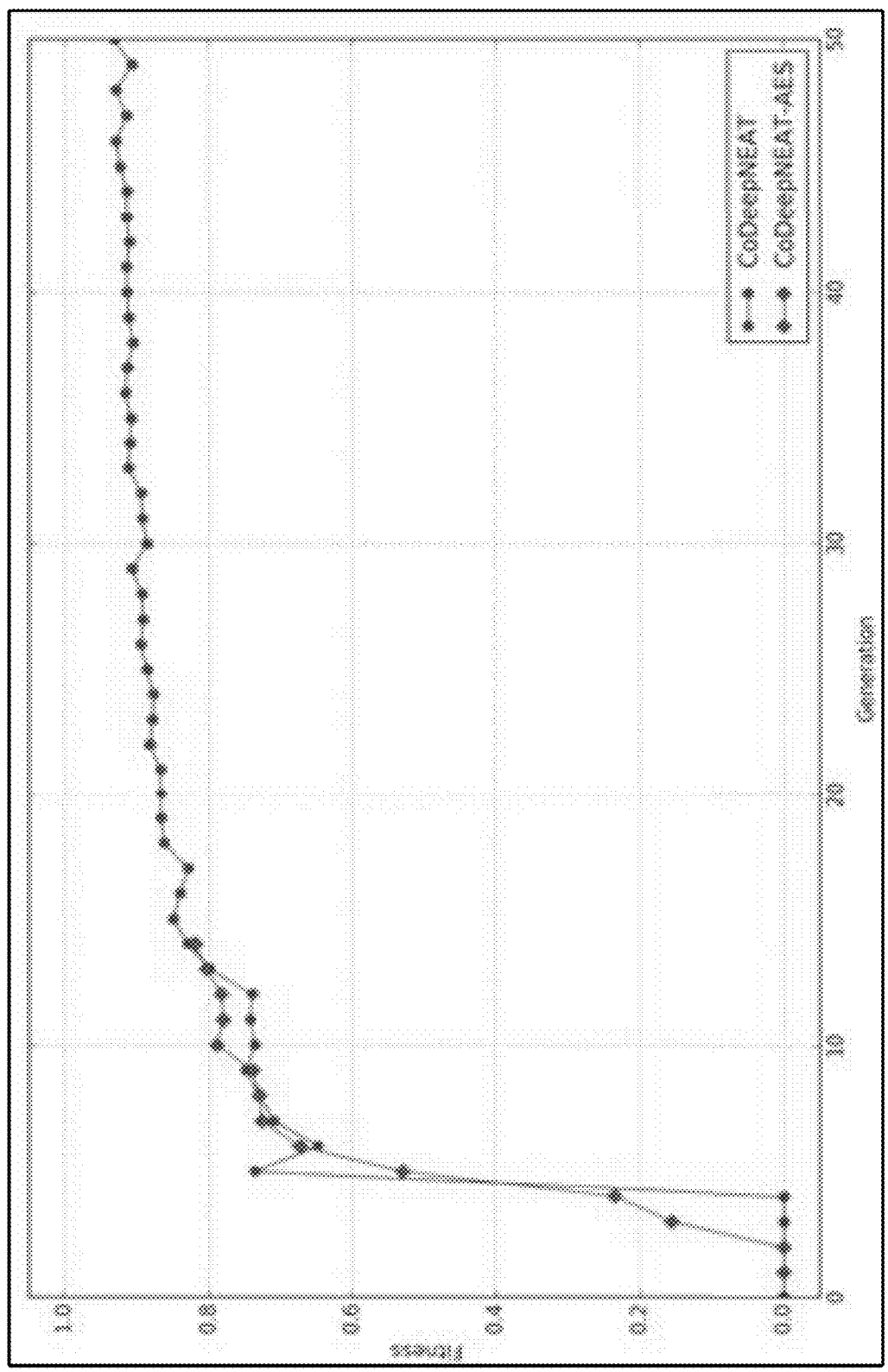
FIG. 8 is a plot of fitness vs number of generations elapsed for synchronous CoDeepNEAT vs CoDeepNEAT-AES.
Figure 9:
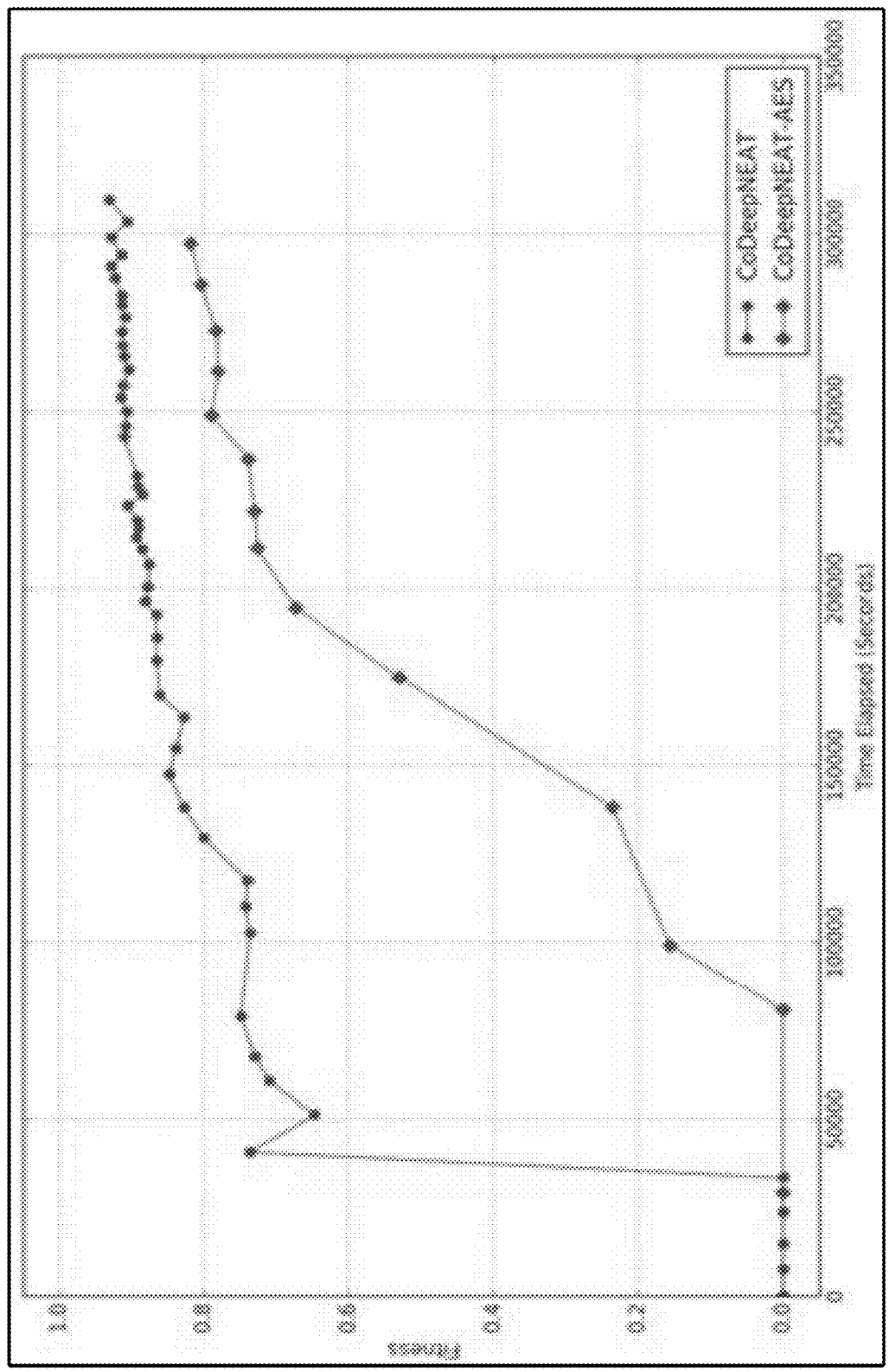
FIG. 9 is a plot of fitness vs time elapsed for synchronous CoDeepNEAT vs CoDeepNEAT-AES.
Figure 10:
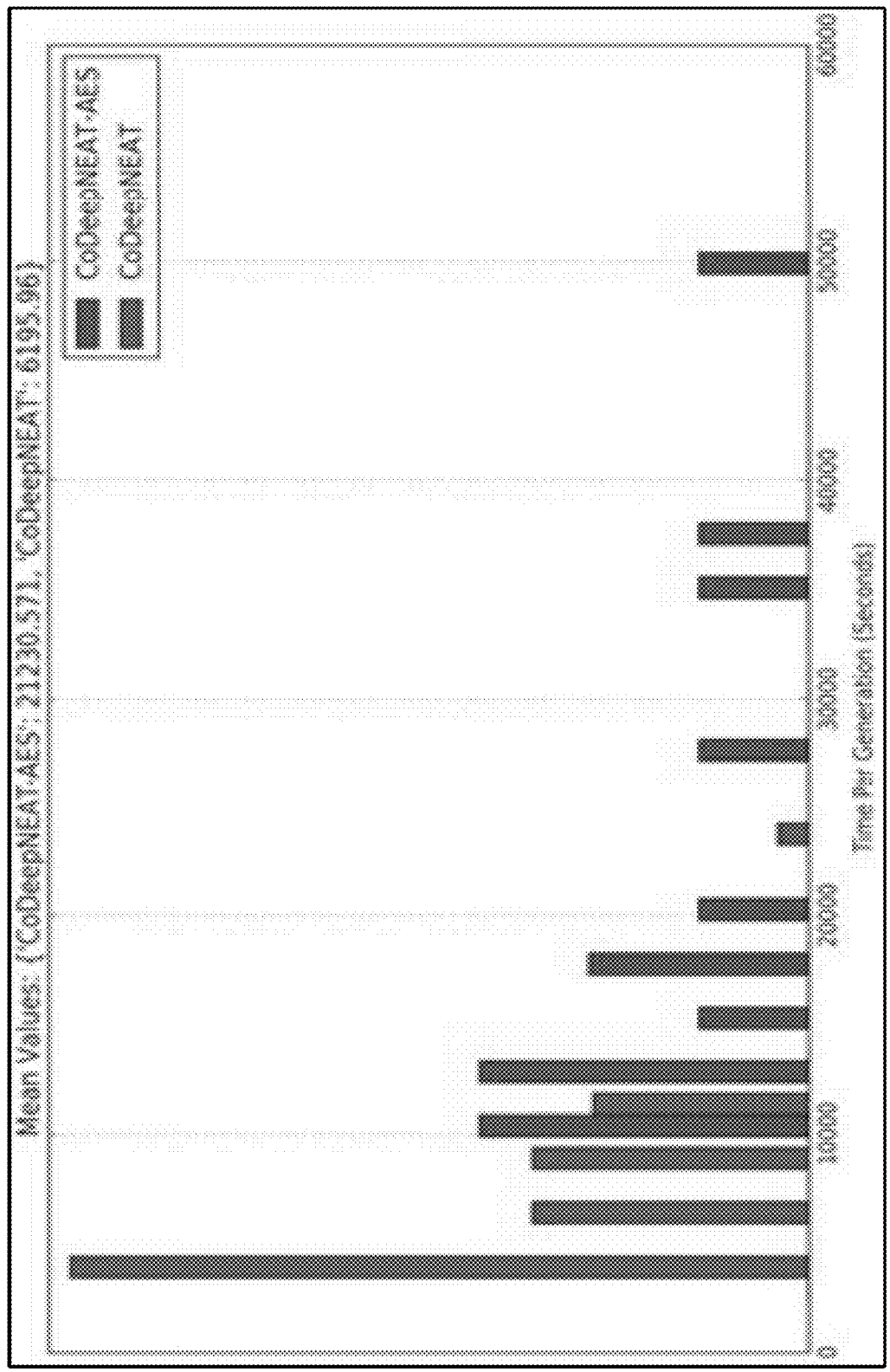
FIG. 10 is a histogram of time per generation for synchronous CoDeepNEAT vs CoDeepNEAT-AES.

From FIG. 9 and the histogram of FIG. 10, it is quite clear that the synchronous version of CoDeepNEAT runs significantly slower than disclosed CoDeepNEAT-AES. Although both versions of CoDeepNEAT achieve similar fitness after the same number of generations (FIG. 8), each generation of synchronous CoDeepNEAT takes far longer; this can be seen in the plot of fitness versus the amount of time elapsed. Due to time constraints, only CoDeepNEAT is allowed to run to convergence. However, the converged fitness value for CoDeepNEAT (0.93) is essentially identical to the converged fitness of a previous run of synchronous CoDeep-NEAT in. Overall, the experiment results suggest that disclosed AES is capable of accelerating the performance of CoDeepNEAT by up to three times in the image captioning domain.

As the experimental results show, the disclosed AES seems to provide significant speedups in both the multiplexer and image captioning domains. Furthermore, the hyperparameter D seems to have a massive impact on the performance for the disclosed AES. In the case where D=1 (M=K), the disclosed AES becomes identical to a synchronous evaluation strategy and thus becomes slow for the reasons mentioned above. Interesting enough, setting a value for D that is too large also hurts performance. This is probably because as M gets smaller, both the returned individuals and the new population that is generated from them become less diverse.

Figure 11:
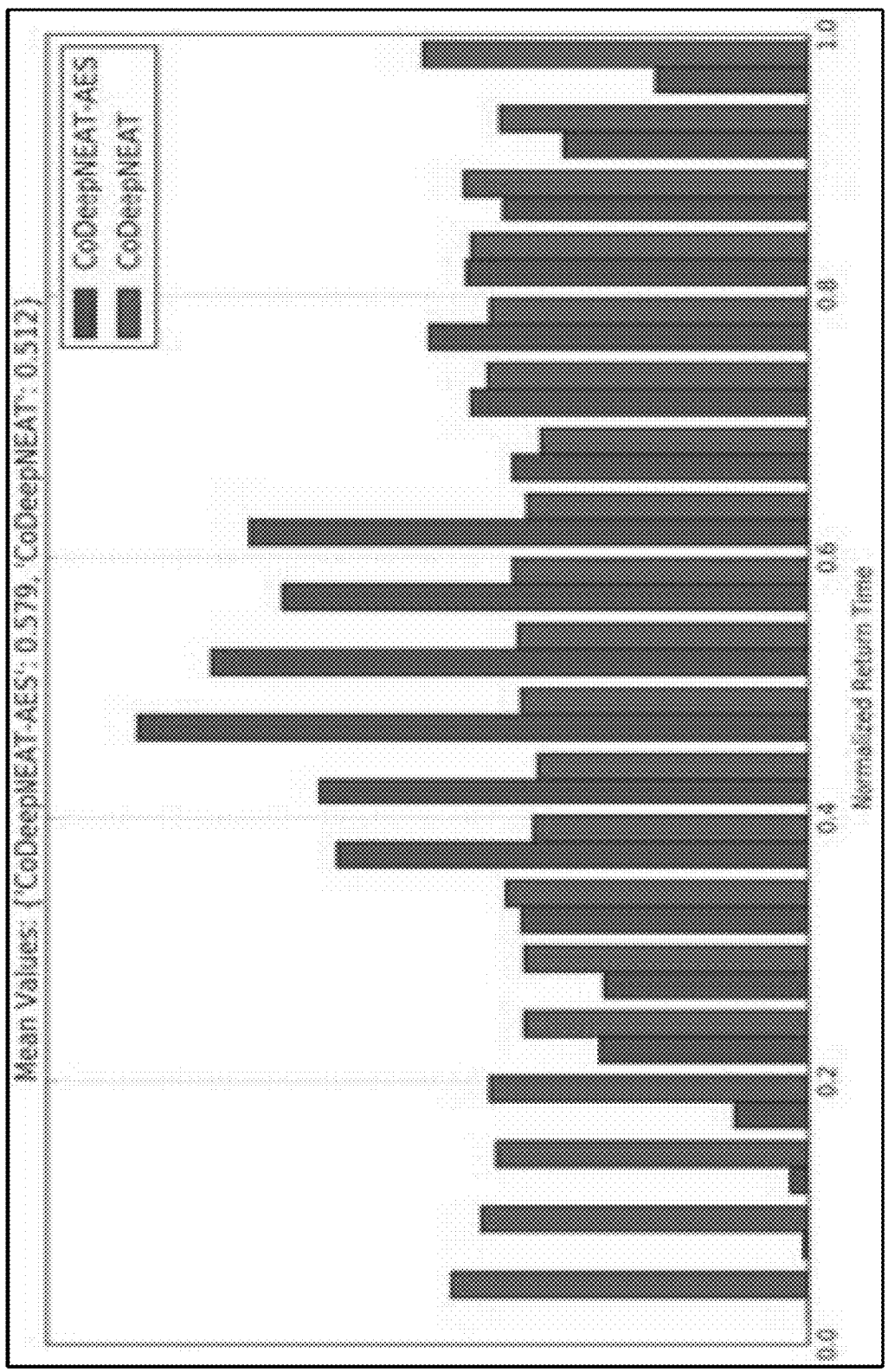
FIG. 11 is a histogram of frequency of returned results over the course of an average generation for synchronous CoDeepNEAT vs CoDeepNEAT-AES.

The histogram in FIG. 11 reveals how the disclosed AES improves performance over a synchronous evaluation strategy. This plot visualizes the relative frequency at which individuals (along with their fitness) return from the completion service over the duration of an average generation. In the synchronous version of CoDeepNEAT, individuals in the population are submitted and all come back in the same generation before evolution can proceed. As a result the histogram for synchronous CoDeepNEAT resembles a Gaussian distribution with few individuals returning early and later only. As a result a lot of time is wasted by the evolutionary algorithm waiting for the last few individuals to return at the end of a generation. On the other hand, this does not occur with the disclosed CoDeepNEAT-AES and the flat distribution in the histogram reflects that. Individuals are returned at a very steady, regular rate over the course of a generation and there are no slow individuals which might bottleneck the evolutionary algorithm.

Figure 12:
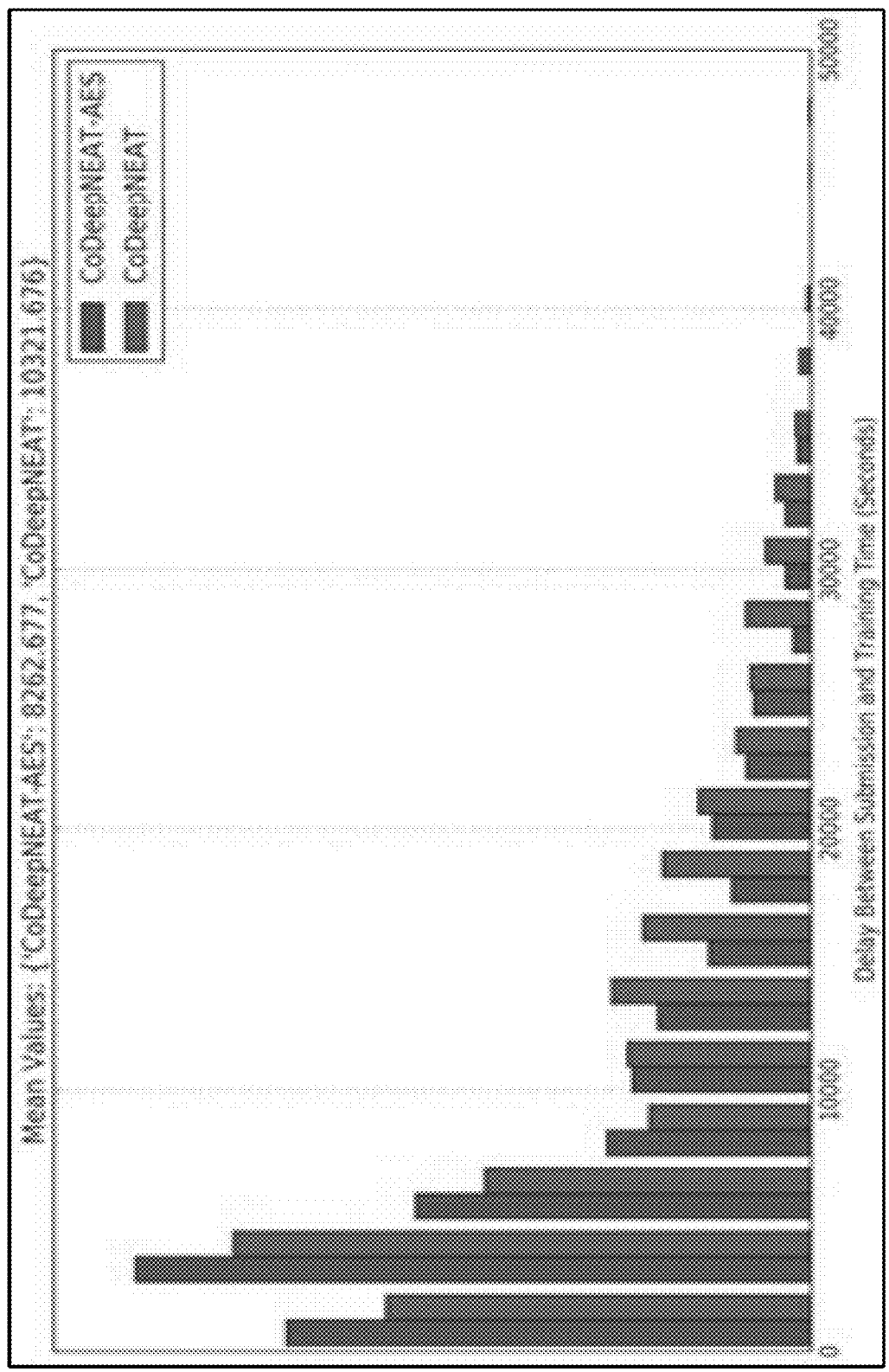
FIG. 12 is a histogram comparing the delay between submission of individuals and when they are actually trained for synchronous CoDeepNEAT vs CoDeepNEAT-AES.

There is a statistic where the synchronous version of CoDeep-NEAT seems to show an advantage. This is seen in the histogram in FIG. 12. This histogram visualizes the time delay between when an individual is submitted by the server to the completion service and when that same individual is evaluated (trained) by a worker node. The delay amount is slightly higher on average for the disclosed CoDeepNEAT-AES. This is probably due to the fact that the disclosed CoDeepNEAT-AES maintains more individuals on the completion service submission buffer. However, as the fitness plot in FIG. 9 indicates, having a higher delay does not seem to negatively affect performance.

Some implementations combine the disclosed CoDeep-NEAT-AES with other improvements such as age-layering and learning curve prediction. Furthermore, more extensive experiments analyze how different values for K and D affect the performance of disclosed CoDeepNEAT-AES.

Computer System

Figure 13:
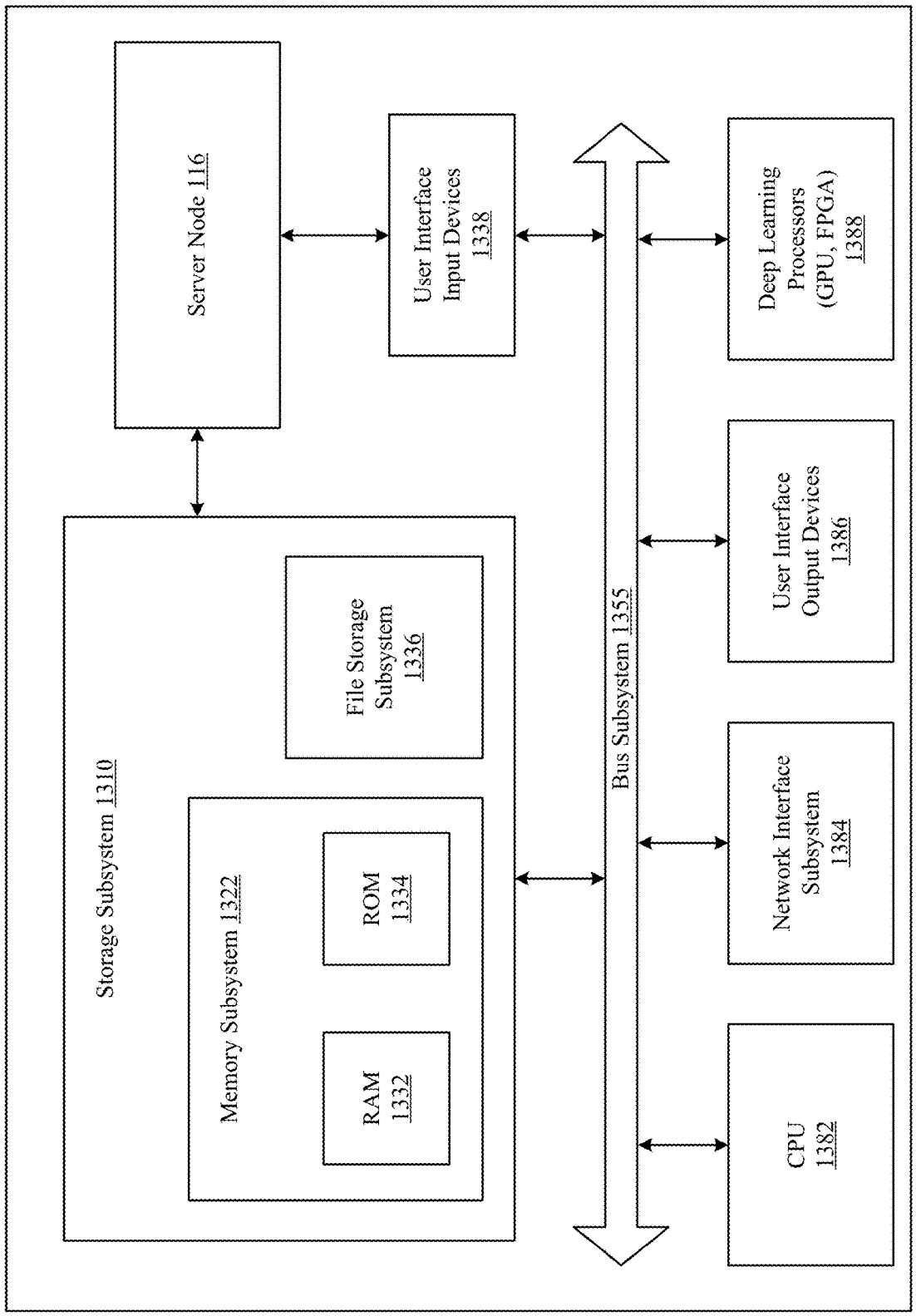
FIG. 13 illustrates one implementation of a computer system that can be used to implement the technology disclosed.

FIG. 13 illustrates one implementation of a computer system 1300 that can be used to implement the server computer node 116, a computer system managing the queue 118 (if different), and each of the worker nodes 142a-n, as well as any other computer system that might be used to implement the technology disclosed. Computer system 1300 includes at least one central processing unit (CPU) 1382 that communicates with a number of peripheral devices via bus subsystem 1355. These peripheral devices can include a storage subsystem 1310 including, for example, memory devices and a file storage subsystem 1336, user interface input devices 1338, user interface output devices 1386, and a network interface subsystem 1384. The input and output devices allow user interaction with computer system 1300. Network interface subsystem 1384 provides an interface to outside networks, including an interface to corresponding interface devices in other computer systems. The server node 116 can be communicably linked to the storage subsystem 1310 and the user interface input devices 1338.

User interface input devices 1338 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1300.

User interface output devices 1386 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1300 to the user or to another machine or computer system.

Storage subsystem 1310 stores programming and data constructs that provide the functionality of some or all of the modules and methods described herein. These software modules are generally executed by deep learning processors 1388.

Deep learning processors 1388 can be graphics processing units (GPUs) or field-programmable gate arrays (FPGAs). Deep learning processors 1388 can be hosted by a deep learning cloud platform such as Google Cloud Platform™, Xilinx™, and Cirrascale™. Examples of deep learning processors 1388 include Google's Tensor Processing Unit (TPU)™, rackmount solutions like GX4 Rackmount Series™, GX13 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™ NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 1322 used in the storage subsystem 1310 can include a number of memories including a main random access memory (RAM) 1332 for storage of instructions and data during program execution and a read only memory (ROM) 1334 in which fixed instructions are stored. A file storage subsystem 1336 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1336 in the storage subsystem 1310, or in other machines accessible by the processor.

Bus subsystem 1355 provides a mechanism for letting the various components and subsystems of computer system 1300 communicate with each other as intended. Although bus subsystem 1355 is shown schematically as a single bus, alternative implementations of the bus subsystem can use multiple busses.

Computer system 1300 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1300 depicted in FIG. 13 is intended only as a specific example for purposes of illustrating the preferred embodiments of the present invention. Many other configurations of computer system 1300 are possible having more or less components than the computer system depicted in FIG. 13.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A system for accelerated evolution of individuals including neural network supermodules and neural network blueprints having slots for selected ones of the supermodules that solve a provided problem using a plurality of worker nodes, comprising:
   a memory that stores in a candidate pool an initial (i=0) population of K initial individuals;
   a server node that distributes the initial population of K initial individuals among the worker nodes for evaluation, wherein each K initial individual defines a respective blueprint and a respective arrangement of supermodules for the slots of the blueprint;
   in each i'th generation in a plurality of generations, beginning with a first (i=1) generation, the server node:
   receives back evaluated individuals, Mi, from the worker nodes, each of the Mi evaluated individuals being returned with a respective fitness value,
   in response to receiving back Mi evaluated individuals, wherein 1<Mi<K, updates the candidate pool with the Mi returned evaluated individuals,
   selects an elitist subset of the Mi evaluated individuals in the candidate pool in dependence upon their respective fitness values,
   procreates individuals in the elitist subset to produce an i'th candidate pool of Ni procreated individuals, wherein 1<Ni<K, and
   distributes among the worker nodes for evaluation, the Ni procreated individuals from the i'th candidate pool; and
   after the plurality of generations, the server node provides individuals from the candidate pool for deployment.

2. The system of claim 1, wherein in a particular j'th one of the generations, Mj evaluated individuals received back from the worker nodes include at least two individuals that had been distributed for evaluation from different generations of the candidate pool.

3. The system of claim 1, wherein in a particular j'th one of the generations, Nj procreated individuals distributed among the worker nodes include at least two individuals from different generations of the candidate pool.

4. The system of claim 1, wherein Mi≥20 for each of the generations in the plurality of generations.

5. The system of claim 1, wherein Ni=Mi for each of the generations in the plurality of generations.

6. The system of claim 1, wherein Mi=K/D, D>1 for each of the generations in the plurality of generations, wherein D is a hyperparameter which controls the ratio between K and Mi.

7. The system of claim 1, wherein the Ni procreated individuals in each i'th candidate pool include the elitist subset in the i'th generation.

8. The system of claim 1, wherein time required to evaluate an individual during the evaluation varies among the K initial individuals in the initial population by a factor of at least 10.

9. The system of claim 1, wherein time required to evaluate an individual during the evaluation varies among the Ni procreated individuals from the i'th candidate pool by a factor of at least 10.

10. The system of claim 1, wherein the evolution of individuals comprises evolution of deep neural networks to solve the provided problem,
    and wherein each individual distributed among the worker nodes defines a respective deep neural network.

11. A method of accelerating evolution of individuals including neural network supermodules and neural network blueprints having slots for selected ones of the supermodules that solve a provided problem, including:
    providing for evaluation an initial set of K initial individuals, wherein K>2, and further wherein each K initial individual defines a respective blueprint and a respective arrangement of supermodules for the slots of the blueprint;
    at each i'th one of a plurality of generations, in response to receiving back a current generation of Mi of the individuals provided for evaluation:
    evolving in dependence upon the received Mi evaluated individuals a respective set of Ni evolved individuals for a next one of the generations; and
    providing for evaluation the set of Ni evolved individuals,
    wherein 1<Mi<K and 1<Ni<K for each of the generations in the plurality of generations.

12. The method of claim 11, wherein Mi≥20 for each of the generations in the plurality of generations.

13. The method of claim 11, wherein Ni=Mi for each of the generations in the plurality of generations.

14. The method of claim 11, wherein Mi=K/D, D>1 for each of the generations in the plurality of generations, wherein D is a hyperparameter which controls the ratio between K and Mi.

15. The method of claim 11, wherein time required to evaluate an individual during the evaluation varies among the K individuals in the initial set by a factor of at least 10.

16. The method of claim 11, wherein time required to evaluate an individual during the evaluation varies among the Ni evolved individuals in the set by a factor of at least 10.

17. The method of claim 11, wherein the evolving further includes selecting an elitist subset of the Mi evaluated individuals in dependence upon their respective fitness estimates and procreating individuals in the elitist subset to produce the Ni procreated individuals.

18. A system for accelerated evolution of deep neural networks that solve a provided problem using a plurality of worker nodes, comprising:
    a memory that stores in a structure candidate pool an initial (i=0) population of neural network supermodules and an initial (i=0) population of K neural network blueprint structures, each of the blueprint structures having slots for selected ones of the neural network supermodules;
    a server node that distributes among the worker nodes for evaluation, an initial population of K assembled networks, each of the assembled networks identifying a respective one of the neural network blueprint structures and a corresponding arrangement of the neural network supermodules from the structure candidate pool for the slots of the respective assembled network;
    in each i'th generation in a plurality of generations, beginning with a first (i=1) generation, the server node:
    receives back from the worker nodes, evaluated assembled networks Mi previously distributed to the worker nodes for evaluation, each of the Mi evaluated assembled networks being returned with a respective fitness value, in response to receiving back Mi evaluated assembled networks, wherein 1<Mi<K, and updates the structure candidate pool with:
    the blueprints in the structure candidate pool with the blueprints of each of the Mi evaluated assembled networks, and
    the supermodules in the structure candidate pool with the supermodules of the Mi evaluated assembled networks;
evolves an i'th generation structure candidate pool of neural network supermodules and an i'th population of neural network blueprint structures in dependence upon respective blueprint and supermodule fitness values, and
distributes Ni evolved assembled networks among the worker nodes for evaluation, wherein 1<Ni<K, each of the Ni evolved assembled networks distributed in the i'th generation identifying a respective one of the blueprints from the i'th structure candidate pool and a respective arrangement of the supermodules from the i'th structure candidate pool for the slots of the respective Ni evolved assembled network; and
after the plurality of generations, the server node provides assembled networks from components in the structure candidate pool for deployment.

19. The system of claim 18, wherein updating the blueprints in the structure candidate pool with the blueprints of each of the Mi evaluated assembled networks comprises:
    for each evaluated assembled network the blueprint of which exists in the structure candidate pool, assigning the fitness value of the evaluated assembled network to the corresponding blueprint in the structure candidate pool; and
    for each evaluated assembled network the blueprint of which does not exist in the structure candidate pool, storing the blueprint of the evaluated assembled network in the structure candidate pool in association with the fitness value of the evaluated assembled network.

20. The system of claim 18, wherein updating the supermodules in the structure candidate pool with the supermodules of the Mi evaluated assembled networks comprises:
    for each first unique supermodule in the evaluated assembled networks, which first supermodule exists in the structure candidate pool, associating a respective fitness value to the corresponding supermodule in the structure candidate pool; and
    for each second unique supermodule in the evaluated assembled networks, which second supermodule does not exist in the structure candidate pool, storing the second unique supermodule in the structure candidate pool in association with a respective fitness value,
    wherein the respective fitness value to be associated with each unique supermodule in the structure candidate pool is a merged version of the fitness values returned with each of the evaluated assembled networks that include the respective unique supermodule.

21. The system of claim 20, wherein the merged version of the fitness values returned with each of the evaluated assembled networks that include the respective unique supermodule is an average of the fitness values returned with each of the evaluated assembled networks that include the respective unique supermodule.

22. The system of claim 18, wherein the memory further stores in the structure candidate pool assembled networks that have been distributed among worker nodes for evaluation,
and wherein in each i'th generation in the plurality of generations the server node, in response to receiving back the Mi evaluated assembled networks, further updates the structure candidate pool by:
    for each evaluated assembled network which exists in the structure candidate pool, assigning the fitness value of the evaluated assembled network to the corresponding assembled network in the structure candidate pool; and
    for each evaluated assembled network which does not exist in the structure candidate pool, storing the evaluated assembled network in the structure candidate pool in association with the fitness value of the evaluated assembled network.

23. The system of claim 18, wherein in each i'th generation in the plurality of generations, evolving the i'th population of Ni neural network blueprint structures comprises:
    selecting a blueprint elitist subset of the blueprints in the updated structure candidate pool in dependence upon fitness values associated with the blueprints; and
    procreating blueprints from the blueprint elitist subset.

24. The system of claim 23, wherein in each i'th generation in the plurality of generations, evolving the i'th population of Ni neural network blueprint structures further comprises discarding from the structure candidate pool all blueprints not in the elitist subset of blueprints and not among the blueprints procreated from the blueprint elitist subset.

25. The system of claim 18, wherein in each i'th generation in the plurality of generations, evolving the i'th generation of neural network supermodules for the structure candidate pool comprises:
    selecting a supermodule elitist subset of the supermodule in the updated structure candidate pool in dependence upon fitness values associated with the supermodule; and
    procreating supermodule from the supermodule elitist subset.

26. The system of claim 18, wherein each of the worker nodes includes a local memory storing a respective subset of the K assembled networks distributed to the worker nodes for evaluation, and wherein the evaluation includes:
    training the each of the assembled networks in the local memory on training data;
    evaluating the trained assembled networks on validation data to develop a fitness value for each of the assembled networks; and
    returning each of the evaluated assembled networks toward the server node with the fitness value developed in the evaluation.

27. The system of claim 26, wherein time required to train an assembled network on the training data varies among the K assembled networks in the initial population by a factor of at least 10.

28. The system of claim 26, wherein time required to train an assembled network on the training data varies among the Ni evolved assembled networks from the i'th candidate pool by a factor of at least 10.

29. The system of claim 18, wherein $Mi \geq 20$ for each of the generations in the plurality of generations.

30. The system of claim 18, wherein Ni=Mi for each of the generations in the plurality of generations.

31. The system of claim 18, wherein Mi=K/D, D>1 for each of the generations in the plurality of generations, wherein D is a hyperparameter which controls the ratio between K and Mi.

* * * * *